US012621020B2

(12) United States Patent
Chen et al.

(10) Patent No.: US 12,621,020 B2
(45) Date of Patent: May 5, 2026

(54) FREQUENCY HOPPING COMMUNICATION METHOD FOR SHORT-DISTANCE WIRELESS COMMUNICATION, AND RELATED DEVICE

(71) Applicant: Huawei Technologies Co., Ltd., Shenzhen (CN)

(72) Inventors: Tong Chen, Shanghai (CN); Han Lu, Shenzhen (CN); Zehong Zhang, Shenzhen (CN); Bixiang Hu, Shenzhen (CN); Yufei Yang, Shenzhen (CN); Rui Cui, Shanghai (CN); Shaojie Xue, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 16 days.

(21) Appl. No.: 18/613,491

(22) Filed: Mar. 22, 2024

(65) Prior Publication Data

US 2024/0235605 A1 Jul. 11, 2024

Related U.S. Application Data

(63) Continuation of application No. PCT/CN2021/120008, filed on Sep. 23, 2021.

(51) Int. Cl.
*H04B 1/715* (2011.01)

(52) U.S. Cl.
CPC ..... *H04B 1/715* (2013.01); *H04B 2001/7154* (2013.01); *H04B 2201/71323* (2013.01)

(58) Field of Classification Search
CPC ............ H04B 1/715; H04B 2001/7154; H04B 2201/71323; H04B 2201/71346; H04B 2201/71376; H04B 1/7143; H04B 1/713; Y02D 30/70
See application file for complete search history.

(56) References Cited

U.S. PATENT DOCUMENTS

| | | | |
|---|---|---|---|
| 6,246,713 B1 | 6/2001 | Mattisson | |
| 7,280,580 B1 | 10/2007 | Haartsen | |
| 2009/0257396 A1 | 10/2009 | Eliezer et al. | |
| 2020/0187219 A1 | 6/2020 | Gan et al. | |
| 2020/0287589 A1* | 9/2020 | Li | .......................... H04L 1/1642 |

FOREIGN PATENT DOCUMENTS

CN 108923819 A 11/2018

OTHER PUBLICATIONS

Machine translation of CN111344952 A (Year: 2020).*

(Continued)

*Primary Examiner* — Jean B Corrielus
(74) *Attorney, Agent, or Firm* — Conley Rose, P.C.

(57) ABSTRACT

A frequency hopping communication method for short-distance wireless communication between a primary device and a secondary device comprises switching by the primary device from the second frequency hopping sequence to the first frequency hopping sequence at a time point of frequency hopping switching, wherein M reserved channels are between a first frequency hopping sequence and a second frequency hopping sequence; and performing frequency hopping communication with the secondary device based on the first frequency hopping sequence.

20 Claims, 10 Drawing Sheets

A primary device sends frequency hopping switching signaling to a secondary device — 401

The primary device performs frequency hopping communication with the secondary device by using a first frequency hopping sequence at a time point of frequency hopping switching — 402

(56)     References Cited

OTHER PUBLICATIONS

Machine translation of WO-2019100406 A1 (Year: 2019).*
Zoran Kostic,et al. "Performancé and Implementation of Dynamic Frequency Hopping in Limited-Bandwidth Cellular Systems", IEEE Transactions on Wireless Communications, XP001143802, Jan. 1, 2002 (Jan. 1, 2002), total 9 pages.
Zoran Kostic,et al. "Dynamic Frequency Hopping in Wireless Cellular Systems-Simulations of Full-Replacement and Reduced-Overhead Methods", Vehicular Technology Conference, 1999 IEEE 49th Houston, XP010342126 , May 16, 1999 (May 16, 1999), total 5 pages.

* cited by examiner

| | |
|---|---|
| 2480 MHz | 39 |
| 2478 MHz | 38 |
| 2476 MHz | 37 |
| 2474 MHz | 36 |
| 2472 MHz | 35 |
| 2470 MHz | 34 |
| 2468 MHz | 33 |
| 2466 MHz | 32 |
| 2464 MHz | 31 |
| 2462 MHz | 30 |
| 2460 MHz | 29 |
| 2458 MHz | 28 |
| 2456 MHz | 27 |
| 2454 MHz | 26 |
| 2452 MHz | 25 |
| 2450 MHz | 24 |
| 2448 MHz | 23 |
| 2446 MHz | 22 |
| 2444 MHz | 21 |
| 2442 MHz | 20 |
| 2440 MHz | 19 |
| 2438 MHz | 18 |
| 2436 MHz | 17 |
| 2434 MHz | 16 |
| 2432 MHz | 15 |
| 2430 MHz | 14 |
| 2428 MHz | 13 |
| 2426 MHz | 12 |
| 2424 MHz | 11 |
| 2422 MHz | 10 |
| 2420 MHz | 9 |
| 2418 MHz | 8 |
| 2416 MHz | 7 |
| 2414 MHz | 6 |
| 2412 MHz | 5 |
| 2410 MHz | 4 |
| 2408 MHz | 3 |
| 2406 MHz | 2 |
| 2404 MHz | 1 |
| 2402 MHz | 0 |

A primary device sends frequency hopping switching signaling to a secondary device — 401

The primary device performs frequency hopping communication with the secondary device by using a first frequency hopping sequence at a time point of frequency hopping switching — 402

FREQUENCY HOPPING COMMUNICATION METHOD FOR SHORT-DISTANCE WIRELESS COMMUNICATION, AND RELATED DEVICE

CROSS-REFERENCE TO RELATED APPLICATIONS

This is a continuation application of International Patent Application No. PCT/CN2021/120008, filed on Sep. 23, 2021, which is hereby incorporated by reference in its entirety.

TECHNICAL FIELD

This application relates to the communication field, and specifically, to a frequency hopping communication method for short-distance wireless communication, and a related device.

BACKGROUND

BLUETOOTH (BT), as a successfully popularized short-distance communication protocol, has been widely used in aspects such as a vehicle-mounted device, a headset, and remote control. After the release of the BT 4.0 protocol, BLUETOOTH Low Energy (BLE) plays an important role in a wearable device. A function of the BT or the BLE has almost become a standard function of every handheld mobile device.

Both the BT and the BLE belong to a narrow-band frequency hopping system. If a narrow band at which frequency hopping is performed has strong interference, a large quantity of packets may be lost. Therefore, an adaptive frequency hopping (AFH) technology is used in both the BT and the BLE. FIG. 1 is a schematic diagram of an adaptive frequency hopping technology in the conventional technology. A primary device finds, by monitoring a channel condition, a frequency with large interference in a used channel range. In this case, after adjusting an adaptive frequency hopping sequence (AHS), the primary device needs to deliver AFH switching signaling or AFH command (AFH CMD) to a secondary device, where the AFH switching signaling includes the frequency with large interference and a switching time point. After the secondary device feeds back an acknowledgment (ACK), the primary device and the secondary device jointly use a new hopping sequence at the agreed switching time point, to switch from an AHS (A) to an AHS (B). In this way, a channel with interference can be effectively avoided, to achieve higher and more efficient transmission.

However, in an existing AFH frequency hopping method, when background noise is strong, a secondary device cannot receive AFH switching signaling sent by a primary device. Consequently, after a switching time point, the primary device and the secondary device use frequency hopping sequences including different frequencies (where the secondary device uses an original frequency hopping sequence, but the primary device uses a new frequency hopping sequence excluding a frequency with large interference) to perform frequency hopping communication. As a result, a communication link connection between the primary device and the secondary device is unstable, a probability of successful communication between the primary device and the secondary device is low, and the primary device and the secondary device cannot reliably communicate with each other.

SUMMARY

Embodiments of this application provide a frequency hopping communication method for short-distance wireless communication, and a related device, to ensure a probability of successful communication between a primary device and a secondary device, so as to ensure stability of a communication link between the primary device and the secondary device.

According to a first aspect, a frequency hopping communication method for short-distance wireless communication is provided, including sending frequency hopping switching signaling to a secondary device, where the frequency hopping switching signaling indicates a first frequency hopping sequence and a time point of frequency hopping switching, the first frequency hopping sequence is different from a second frequency hopping sequence that is currently for frequency hopping communication, the first frequency hopping sequence and the second frequency hopping sequence each include N channels, M reserved channels in the first frequency hopping sequence are consistent with M reserved channels in the second frequency hopping sequence, both M and N are positive integers, and M is less than N; and performing frequency hopping communication with the secondary device by using the first frequency hopping sequence at the time point of the frequency hopping switching.

In the frequency hopping communication method in an embodiment of this application, in a process of communication between the primary device and the secondary device, when a frequency hopping sequence needs to be switched, it is ensured that a frequency used for each frequency hopping remains unchanged (in other words, N remains unchanged), and there are M reserved channels between the first frequency hopping sequence and the second frequency hopping sequence (where locations of the reserved channels are the same as a channel identifier in the first frequency hopping sequence and the second frequency hopping sequence), so that the primary device switches from the second frequency hopping sequence to the first frequency hopping sequence at the time point of the frequency hopping switching, and performs frequency hopping communication with the secondary device based on the first frequency hopping sequence. Even if the secondary device does not effectively receive the frequency hopping switching instruction due to interference or another reason, in other words, the secondary device still performs frequency hopping communication with the primary device by using the second frequency hopping sequence, because there are M same channels between the first frequency hopping sequence and the second frequency hopping sequence, there is still an M/N probability that the primary device and the secondary device can effectively communicate with each other, so that a probability of successful communication between the primary device and the secondary device is effectively ensured, and stability of a communication link between the primary device and the secondary device is ensured.

Optionally, the frequency hopping switching signaling includes a mapping relationship between N sequence number indexes and N channel identifiers, and the channel identifier indicates a channel in the first frequency hopping sequence.

In an embodiment of this application, a manner in which the frequency hopping switching signaling indicates the first frequency hopping sequence is that the signaling carries the mapping relationship between the N sequence number indexes and the N channel identifiers. The channel identifier indicates the channel in the first frequency hopping sequence.

Optionally, the sending frequency hopping switching signaling to a secondary device includes, when the second frequency hopping sequence meets a preset frequency hopping switching condition, sending the frequency hopping switching signaling to the secondary device.

In an embodiment of this application, when a current second frequency hopping sequence meets the preset frequency hopping switching condition, the primary device sends the frequency hopping switching signaling to the secondary device, to trigger frequency hopping sequence switching.

Optionally, the preset frequency hopping switching condition includes at least one of the following such as a quality evaluation parameter of the second frequency hopping sequence meets a sequence evaluation condition, where the quality evaluation parameter represents overall communication quality of the N channels in the second frequency hopping sequence, a quantity of channels whose channel quality is lower than a quality threshold and that are in the second frequency hopping sequence is greater than a quantity threshold; and a change of a channel in a used channel set is detected, where the used channel set is a set of scanned channels whose interference energy values are less than an interference energy threshold or a set of Y scanned channels whose interference energy values are smallest, and Y is a positive integer.

Optionally, the method further includes, when a switching acknowledgment instruction that is sent by the secondary device in response to the frequency hopping switching instruction is not received, resending the frequency hopping switching instruction to the secondary device until the time point of the frequency hopping switching.

In an embodiment of this application, when the switching acknowledgment instruction that is sent by the secondary device in response to the frequency hopping switching instruction is not received, the primary device resends the frequency hopping switching instruction to the secondary device until the time point of the frequency hopping switching. The frequency hopping switching instruction is resent, to ensure that the secondary device can switch to perform frequency hopping communication with the primary device by using the first frequency hopping sequence at the specified time point of the frequency hopping switching.

Optionally, the method further includes replacing N–M channels that meet the preset unused channel condition and that are in the N channels in the second frequency hopping sequence with new used channels, to obtain the first frequency hopping sequence.

In an embodiment of this application, when the first frequency hopping sequence is obtained based on the second frequency hopping sequence, the N–M channels that meet an unused channel condition and that are in the second frequency hopping sequence are replaced with the new used channels, so that the primary device and the secondary device can perform frequency hopping communication by using the second frequency hopping sequence with better channel quality, to ensure communication quality between the primary device and the secondary device.

Optionally, the replacing N–M channels that meet a preset unused channel condition and that are in the N channels in the second frequency hopping sequence with new used channels, to obtain the first frequency hopping sequence includes separately obtaining channel quality of the N channels in the second frequency hopping sequence; and replacing the N–M channels whose channel quality is lower than the quality threshold and that are in the N channels in the second frequency hopping sequence with the new used channels, to obtain the first frequency hopping sequence.

In an embodiment of this application, the preset unused channel condition is that channel quality of a channel is lower than the quality threshold, and a channel in the second frequency hopping sequence is replaced based on the channel quality, to obtain the first frequency hopping sequence with better channel quality.

Optionally, the replacing N–M channels that meet a preset unused channel condition and that are in the N channels in the second frequency hopping sequence with new used channels, to obtain the first frequency hopping sequence includes determining the used channel set, where the used channel set is the set of scanned channels whose interference energy values are less than the interference energy threshold or the set of Y scanned channels whose interference energy values are smallest, and Y is a positive integer; and replacing the N–M channels that are in the N channels in the second frequency hopping sequence and that are not in the used channel set with the new used channels, to obtain the first frequency hopping sequence.

In an embodiment of this application, the preset unused channel condition is that a channel is not in the used channel set. A channel that is in the second frequency hopping sequence and that is not in the used channel set is replaced with a new used channel, to obtain the first frequency hopping sequence with better channel quality.

Optionally, the determining the used channel set includes performing channel scanning based on a preset time interval, and determining an interference energy value corresponding to a scanned channel; and determining scanned channels whose interference energy values are less than the interference energy threshold as the used channel set; or determining first Y scanned channels whose interference energy values are smallest as the used channel set, where Y is a positive integer.

In an embodiment of this application, an interference energy value of each scanned channel may be determined through channel scanning, where the interference energy value represents an interference degree of the channel; and the scanned channels whose interference energy values are less than the interference energy threshold may be used as the used channel set; or the first Y scanned channels whose interference energy values are smallest may be determined as the used channel set. There is another method for determining the used channel set. This is not limited.

Optionally, the method further includes broadcasting the second frequency hopping sequence, to help the secondary device obtain the second frequency hopping sequence from a broadcast signal.

In an embodiment of this application, there are many methods for obtaining the second frequency hopping sequence by the secondary device. For example, the primary device broadcasts the second frequency hopping sequence, and the secondary device may obtain the second frequency hopping sequence from the broadcast signal by receiving the broadcast signal.

Optionally, the method further includes obtaining a device identifier of the secondary device; sending, to the secondary device based on the device identifier of the secondary device, a connection request for requesting to establish a data path connection, where the connection request includes the second frequency hopping sequence; and receiving a connection acknowledgment instruction that is sent by the secondary device in response to the connection request.

In an embodiment of this application, another method for obtaining the second frequency hopping sequence by the secondary device is as follows such as after obtaining the device identifier of the secondary device, requesting, based on the device identifier, the secondary device to establish the data path connection. The connection request may carry the second frequency hopping sequence, to enable the secondary device to obtain the second frequency hopping sequence based on the connection request. The secondary device sends the connection acknowledgment instruction to the primary device in response to the connection request, to establish the data path connection between the primary device and the secondary device.

Optionally, the method further includes, after establishing a data path connection to the secondary device, sending first negotiation signaling to the secondary device, where the first negotiation signaling includes the second frequency hopping sequence; and receiving a first negotiation acknowledgment instruction that is sent by the secondary device in response to the first negotiation signaling.

In an embodiment of this application, the primary device may further send the first negotiation signaling to the secondary device after establishing the data path connection to the secondary device, where the first negotiation signaling may carry the second frequency hopping sequence. In other words, the primary device initiates a negotiation process of the second frequency hopping sequence. When accepting the second frequency hopping sequence, the secondary device may return the first negotiation acknowledgment instruction to the primary device, to complete negotiation of the second frequency hopping sequence.

Optionally, the method further includes receiving second negotiation signaling sent by the secondary device, where the second negotiation signaling is sent after the secondary device establishes a data path connection to the primary device, and the second negotiation signaling includes the second frequency hopping sequence; and sending a second negotiation acknowledgment instruction to the secondary device in response to the second negotiation signaling.

In an embodiment of this application, alternatively, the secondary device may initiate a negotiation process of the second frequency hopping sequence. After the secondary device establishes the data path connection to the primary device, the secondary device sends, to the primary device, the second negotiation signaling that carries the second frequency hopping sequence. When accepting the second frequency hopping sequence, the primary device returns the second negotiation acknowledgment instruction to the secondary device, to complete the negotiation of the second frequency hopping sequence.

According to a second aspect, a frequency hopping communication method for short-distance wireless communication is provided, including receiving frequency hopping switching signaling sent by a primary device, where the frequency hopping switching signaling indicates a first frequency hopping sequence and a time point of frequency hopping switching, the first frequency hopping sequence is different from a second frequency hopping sequence that is currently for frequency hopping communication, the first frequency hopping sequence and the second frequency hopping sequence each include N channels, M reserved channels in the first frequency hopping sequence are consistent with M reserved channels in the second frequency hopping sequence, both M and N are positive integers, and M is less than N; and performing frequency hopping communication with the primary device by using the first frequency hopping sequence at the time point of the frequency hopping switching.

In the frequency hopping communication method in an embodiment of this application, in a process of communication between the primary device and the secondary device, when a frequency hopping sequence needs to be switched, it is ensured that a frequency used for each frequency hopping remains unchanged (in other words, N remains unchanged), and there are M reserved channels between the first frequency hopping sequence and the second frequency hopping sequence (where a location of the reserved channel and a channel identifier are the same in the first frequency hopping sequence and the second frequency hopping sequence), so that the primary device switches from the second frequency hopping sequence to the first frequency hopping sequence at the time point of the frequency hopping switching, and performs frequency hopping communication with the secondary device based on the first frequency hopping sequence. Even if the secondary device still performs frequency hopping communication with the primary device by using the second frequency hopping sequence, because there are M same channels between the first frequency hopping sequence and the second frequency hopping sequence, there is still an M/N probability that the primary device and the secondary device can effectively communicate with each other, so that a probability of successful communication between the primary device and the secondary device is effectively ensured, and stability of a communication link between the primary device and the secondary device is ensured.

Optionally, the frequency hopping switching signaling includes a mapping relationship between N sequence number indexes and N channel identifiers, and the channel identifier indicates a channel in the first frequency hopping sequence.

Optionally, the method further includes sending a switching acknowledgment instruction to the primary device in response to the frequency hopping switching instruction.

Optionally, the method further includes receiving a broadcast signal of the primary device, where the broadcast signal includes the second frequency hopping sequence.

Optionally, the method further includes receiving a connection request that is sent by the primary device and that is for requesting to establish a data path connection, where the connection request includes the second frequency hopping sequence; and sending a connection acknowledgment instruction to the primary device in response to the connection request.

Optionally, the method further includes receiving first negotiation signaling sent by the primary device, where the first negotiation signaling includes the second frequency hopping sequence; and sending a first negotiation acknowledgment instruction to the primary device in response to the first negotiation signaling.

Optionally, the method further includes, after establishing a data path connection to the primary device, sending second negotiation signaling to the primary device, where the second negotiation signaling includes the second frequency hopping sequence; and receiving a second negotiation acknowledgment instruction that is sent by the primary device in response to the second negotiation signaling.

According to a third aspect, a primary device for short-distance wireless communication is provided, including a transceiver, configured to send frequency hopping switching signaling to a secondary device, where the frequency hopping switching signaling indicates a first frequency hopping sequence and a time point of frequency hopping switching, the first frequency hopping sequence is different from a second frequency hopping sequence that is currently for frequency hopping communication, the first frequency hopping sequence and the second frequency hopping sequence each include N channels, M reserved channels in the first frequency hopping sequence are consistent with M reserved channels in the second frequency hopping sequence, both M and N are positive integers, and M is less than N; and a processor, configured to perform frequency hopping communication with the secondary device by using the first frequency hopping sequence and by using the transceiver at the time point of the frequency hopping switching.

According to a fourth aspect, a secondary device for short-distance wireless communication is provided, including a transceiver, configured to receive frequency hopping switching signaling sent by a primary device, where the frequency hopping switching signaling indicates a first frequency hopping sequence and a time point of frequency hopping switching, the first frequency hopping sequence is different from a second frequency hopping sequence that is currently for frequency hopping communication, the first frequency hopping sequence and the second frequency hopping sequence each include N channels, M reserved channels in the first frequency hopping sequence are consistent with M reserved channels in the second frequency hopping sequence, both M and N are positive integers, and M is less than N; and a processor, configured to perform frequency hopping communication with the primary device by using the first frequency hopping sequence and by using the transceiver at the time point of the frequency hopping switching.

According to a fifth aspect, a frequency hopping communication system for short-distance wireless communication is provided, including the primary device in the third aspect and the secondary device in the fourth aspect.

According to a sixth aspect, a communication device is provided, including a processor and a memory. The processor is connected to the memory, the memory is configured to store program code, and the processor is configured to invoke the program code, to perform the frequency hopping communication method for short-distance wireless communication in the first aspect or the second aspect.

According to a seventh aspect, a computer storage medium is provided. The computer storage medium stores a computer program, the computer program includes program instructions. When the program instructions are executed by a processor, the frequency hopping communication method for short-distance wireless communication in the first aspect or the second aspect is performed.

According to an eighth aspect, a computer program product including instructions is provided. When the computer program product runs on a computer, the computer is enabled to perform the frequency hopping communication method for short-distance wireless communication in the first aspect or the second aspect.

According to a ninth aspect, a chip is provided. The chip includes a processor and a data interface, and the processor reads, by using the data interface, instructions stored in a memory, to perform the frequency hopping communication method for short-distance wireless communication in the first aspect or the second aspect.

Optionally, in an implementation, the chip may further include the memory. The memory stores the instructions, and the processor is configured to execute the instructions stored in the memory. When the instructions are executed, the processor is configured to perform the frequency hopping communication method for short-distance wireless communication in the first aspect or the second aspect.

BRIEF DESCRIPTION OF DRAWINGS

To describe technical solutions in embodiments of this application more clearly, the following briefly describes the accompanying drawings required used in describing embodiments. It is clear that the accompanying drawings in the following descriptions show some embodiments of this application, and a person of ordinary skill in the art may still derive other drawings from these accompanying drawings without creative efforts.

DESCRIPTION OF EMBODIMENTS

Figure 1:
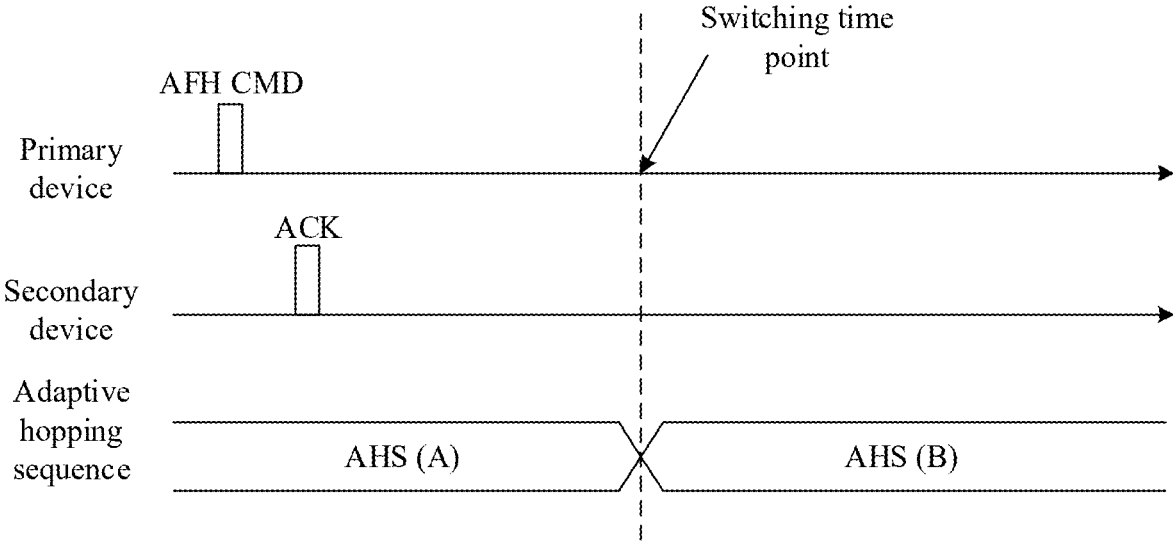
FIG. 1 is a schematic diagram of an adaptive frequency hopping technology in a conventional technology.

The following describes the technical solutions in embodiments of this application with reference to the accompanying drawings in embodiments of this application. The described embodiments are some but not all of embodiments of this application. All other embodiments obtained by a person of ordinary skill in the art based on embodiments of this application without creative efforts shall fall within the protection scope of this application.

In the specification, claims, and accompanying drawings of this application, the terms "first", "second", "third", "fourth" and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this specification means that a particular feature, result, or characteristic described with reference to embodiments may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

For ease of understanding, the following first describes related terms and concepts that are used in embodiments of this application.

(1) Primary Device and Secondary Device

A communication system includes a primary device and a secondary device. When the primary device communicates with the secondary device, the primary device sends a message to the secondary device. After receiving the message, the secondary device does not reply a message, or replies a message to the primary device. A frequency hopping communication method in embodiments of this application may be applied to an electronic device that communicates based on a short-distance wireless communication protocol. The electronic device may be a primary device, or may be a secondary device. The primary device refers to a device working in a primary device mode, and the secondary device refers to a device working in a secondary device mode.

When working in the primary device mode, the primary device may be connected to one secondary device. In this mode, surrounding devices may be searched and the secondary device that needs to be connected may be selected for connection. BT is used as an example. Theoretically, one BT primary device may simultaneously communicate with seven BT secondary devices. A device with a BT communication function can switch between two roles. The device normally works in the secondary device mode, and waits for a connection to another primary device. When necessary, the device switches to the primary device mode, and initiates a call to another device.

However, the secondary device works in the secondary device mode, can only be searched by a primary device, and cannot actively search for another device. After the secondary device establishes a connection to the primary device, the secondary device may send data to the primary device or receive data from the primary device.

(2) Link Layer (LL)

A data link layer is a second layer in an OSI reference model, and is located between a physical layer and a network layer. The data link layer provides, based on a service provided by the physical layer, a service for the network layer. A basic service of the data link layer is to reliably transmit data from the physical layer to a target machine network layer of an adjacent node.

(3) Short-Distance Wireless Communication

A main characteristic of the short-distance wireless communication is that a communication distance is short and a coverage distance is usually 10 to 200 m. A short-distance wireless communication protocol includes BT, BLE, ZIGBEE, ANT+, and the like. ZIGBEE is a wireless network protocol for low-speed short-distance transmission. The ANT+ protocol is an ultra-low-power consumption version on the ANT transmission protocol, and is developed for health, training, and a sports device. In addition, a frequency band usually used for the short-distance wireless communication protocol is a 2.4 gigahertz (GHz) frequency band (2.4 GHz to 2.5 GHz), and this frequency band may be divided into 100 frequencies, for example, 2400 megahertz (MHz), 2401 MHz, 2402 MHz, and up to 2500 MHz. For devices that use different short-distance wireless communication protocols, different quantities of frequencies may be used for communication.

Figure 2:
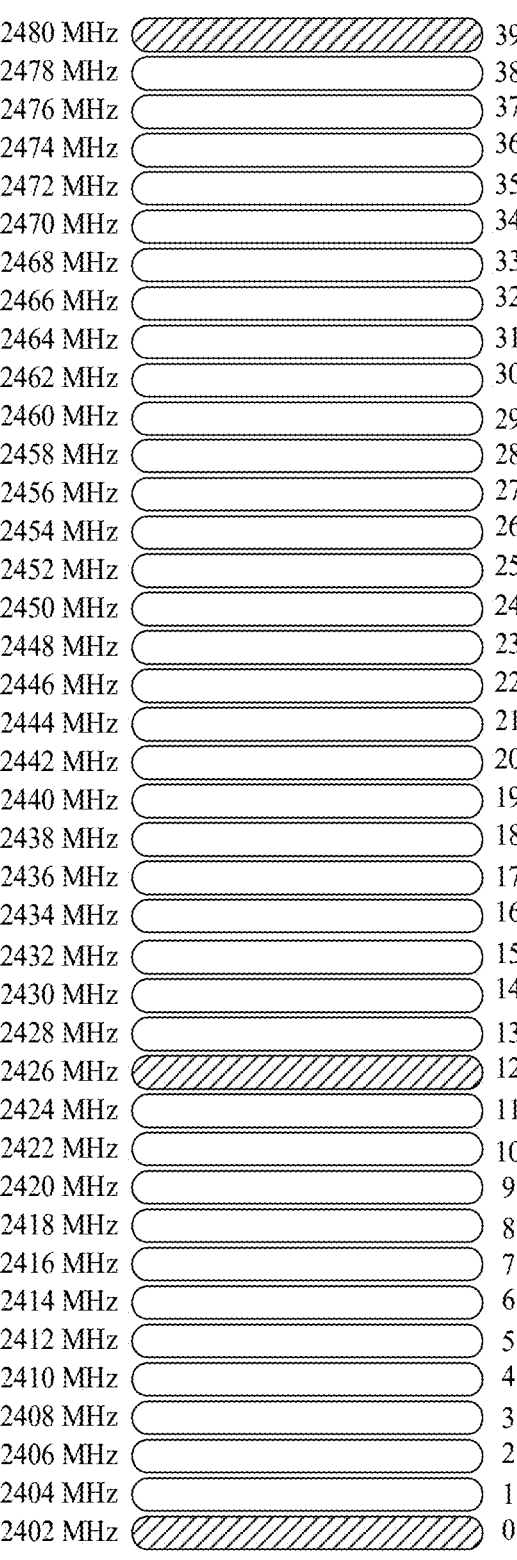
FIG. 2 is a diagram of frequency allocation of BLE.

A BT communication protocol is used as an example. A communication frequency band of a low-power consumption BT electronic device is from 2400 MHz to 2480 MHz. FIG. 2 is a diagram of frequency allocation of BLE. A communication frequency band may be evenly divided into 40 channels, and a frequency range of each channel is 2 MHz. A lowest center frequency of the 40 channels is 2402 MHz, and a highest center frequency of the 40 channels is 2480 MHz. At a link layer, the 40 channels are divided into broadcast channels and data channels. Channels 1 to 11 and 13 to 38 are 37 data channels, and channels 0, 12, and 39 are three broadcast channels.

(4) Frequency Hopping Communication

Frequency hopping refers to a communication manner in which a carrier frequency on which a transmitter and a receiver transmit a signal changes discretely based on a predetermined rule. In other words, a carrier frequency used in communication changes randomly under control of a pseudo random change code. "Frequency hopping communication" means that a frequency changes for each communication. The frequency hopping communication has a good anti-interference capability. Even if a part of frequencies are interfered, communication can still be normally performed on another frequency that is not interfered.

A ZIGBEE communication protocol is used as an example. In ZIGBEE, 16 channels may be used in total, and a frequency ranges from 2405 MHz to 2480 MHz. In the ZIGBEE, a fixed channel (where the frequency remains unchanged) is usually used. If the ZIGBEE is interfered by another 2.4 G signal (such as BT or Wi-Fi), another channel with less interference may be automatically selected for use.

The BT (e.g., BT, BLE, and the like) uses a series of unique measures, such as AFH, listen before talk (LBT), and power control, to overcome interference and avoid a conflict. The AFH frequency adaptive control means that, in a process of the frequency hopping communication, frequencies that have been used but on which transmission fails are rejected, so that the frequency hopping communication is performed on frequencies that can be used and that have no interference, to greatly improve quality of a received signal in the frequency hopping communication.

(5) Adaptive Frequency Hopping

In an adaptive frequency hopping AFH technology, channel quality is evaluated after data transmission of each time. If quality of a current channel is poor, the current channel is deleted from a used channel list. In an example, in BLE, the adaptive frequency hopping technology is to remap a bad (severely interfered) channel (unused channel) to a good channel (used channel). When a frequency hopping algorithm jumps to the bad channel, the remapped good channel is actually used for data transmission.

Further, in BT frequency hopping communication, a frequency used by a primary device and a secondary device for next-time data communication is determined based on a frequency hopping table and a frequency hopping step by using one frequency hopping table and one frequency hopping step. A value of the frequency hopping step may be a fixed value. The value of the frequency hopping step may alternatively be a changing value calculated by using an algorithm. For example, the value of the frequency hopping step may be obtained by performing algorithm calculation by using fixed information and changing information (one or more than two pieces of information) that is agreed by both parties. The changing information agreed by both parties may be a quantity of data packets received by the primary device from the secondary device, or counting time of a slot counter of the primary device. The fixed information may be a unique identifier of a device, and usually may be a device identifier (ID) of the primary device. The device ID may be a medium access control (MAC) address of the device.

Figure 3:
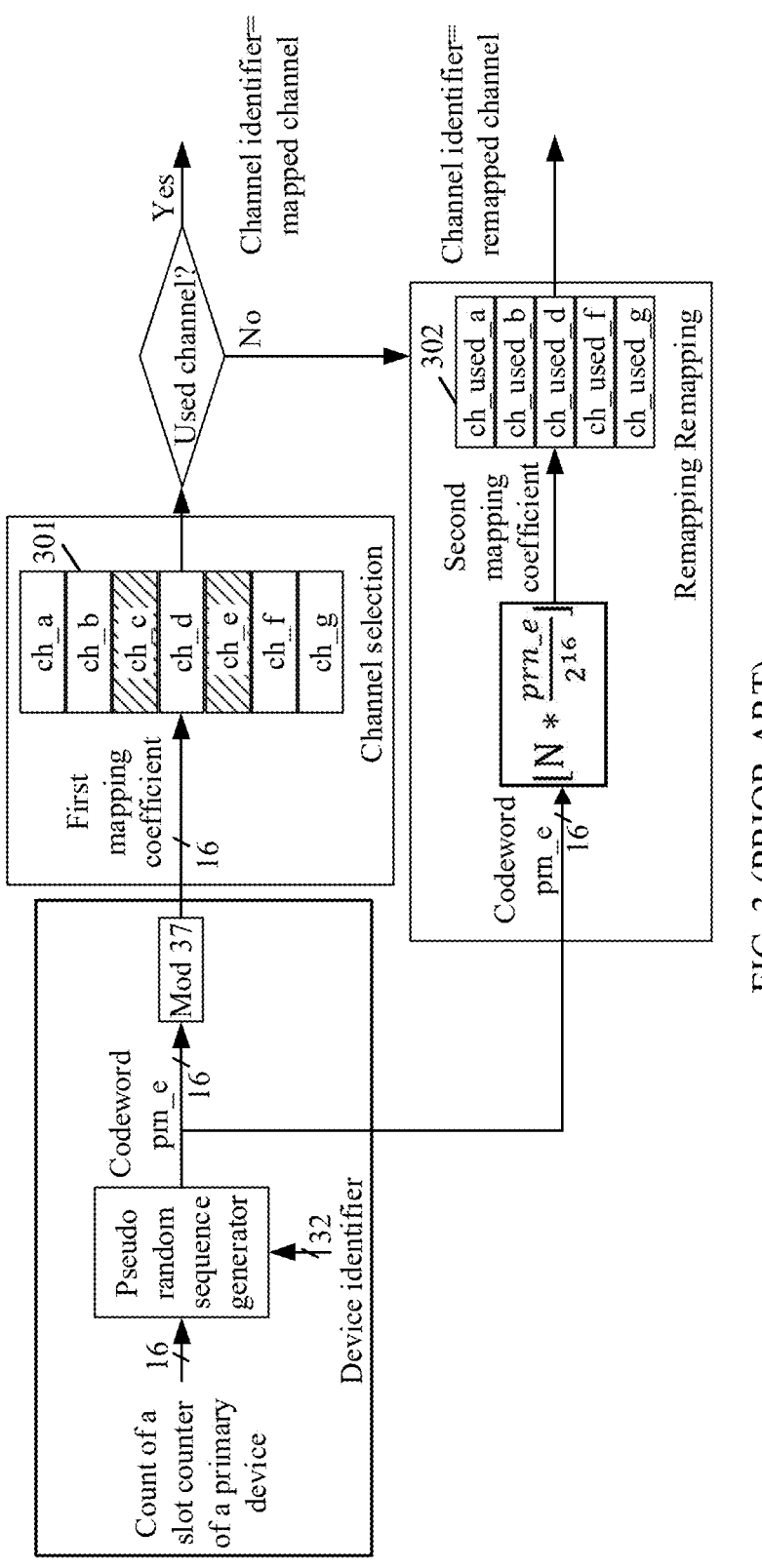
FIG. 3 is a schematic diagram of an AFH technology.

FIG. 3 is a schematic diagram of the AFH technology. A principle of an existing frequency hopping technology is described in detail by using the AFH technology in the BLE as an example.

A data channel of the BLE has 37 frequencies. When interference exists, there are at least two used frequencies. A frequency to be finally used is determined based on a channel interference status. A channel is classified into a used channel or an unused channel). A used channel list is a table 302 (where for example, the table 302 includes a channel a, a channel b, a channel d, a channel f, and a channel g), while a table 301 is a permutation table of 37 channels (where it is assumed that the table 301 includes the channel a, the channel b, a channel c, the channel d, a channel e, the channel f, and the channel g). Each time a channel is used, a count of the slot counter of the primary device and the device ID of the primary device are used as inputs, and are input into a pseudo random sequence generator to obtain a codeword prn_e (where the codeword refers to a signal encoded by using a Huffman code). Then, a modulo n operation is performed on the codeword prn_e, where n is 37, to obtain a first mapping coefficient (in other words, the foregoing value of the frequency hopping step), and the table 301 is searched based on the first mapping coefficient to determine a mapped channel. In other words, mapping is first performed based on a universal set of 37 (which is referred to as full mapping, where a generated sequence is a pseudo random generation sequence). Each time if a channel obtained through mapping is in the table 302, for example, the channel a, the channel is directly used for information interaction, in other words, a channel identifier in this case is a channel identifier of the mapped channel. If a channel obtained through full mapping is not in the table 302, for example, the channel c or the channel e, mapping is performed in the table 302 (where the channels in the table 302 are re-sorted after refreshing of each time), which is referred to as remapping. Communication is performed by using a remapped frequency, in other words, a channel identifier in this case is a channel identifier of a remapped channel. A second mapping coefficient can be obtained through calculation by using a codeword and a remapping formula (where N in the remapping formula in FIG. 3 is 5, in other words, a quantity of the channels in the table 302), and one used channel may be obtained through remapping in the table 302 based on the second mapping coefficient.

In an AFH frequency hopping method in a conventional technology, when background noise is strong, a secondary device cannot receive AFH switching signaling sent by a primary device. Consequently, after an agreed time point of frequency hopping switching, the primary device and the secondary device use frequency hopping sequences including different frequencies (where the secondary device uses the original table 302, and the primary device uses the new table 302 in which a frequency with great interference is removed) to perform frequency hopping communication. As a result, a communication link connection between the primary device and the secondary device is unstable, a probability of successful communication between the primary device and the secondary device is low, and the primary device and the secondary device cannot reliably communicate with each other. In an example, when the primary device and the secondary device have not completed response interaction of AFH signaling at the time point of the frequency hopping switching, a quantity of fully mapped channels is 37, and a quantity of intersection sets between the tables 302 of the primary device and the secondary device is X. In this case, a communication probability of the primary device and the secondary device is X/37, and a smaller quantity of interaction sets between used channels of the two devices indicates a lower communication probability.

To resolve the foregoing technical problems, embodiments of this application provide a frequency hopping communication method that is based on short-distance wireless communication. In the method, it is ensured that a quantity N of channels used before frequency hopping switching and a quantity N of channels used after the frequency hopping switching are the same, and it is ensured that frequency hopping sequences before and after the frequency hopping switching have an intersection set, to ensure communication probabilities of more channels. Even if a primary device and a secondary device cannot correctly interact with frequency hopping switching signaling at a time point of frequency hopping switching due to interference, there is still a probability of successful communication between the primary device and the secondary device.

Embodiment 1

Figures 4, 5, 6:
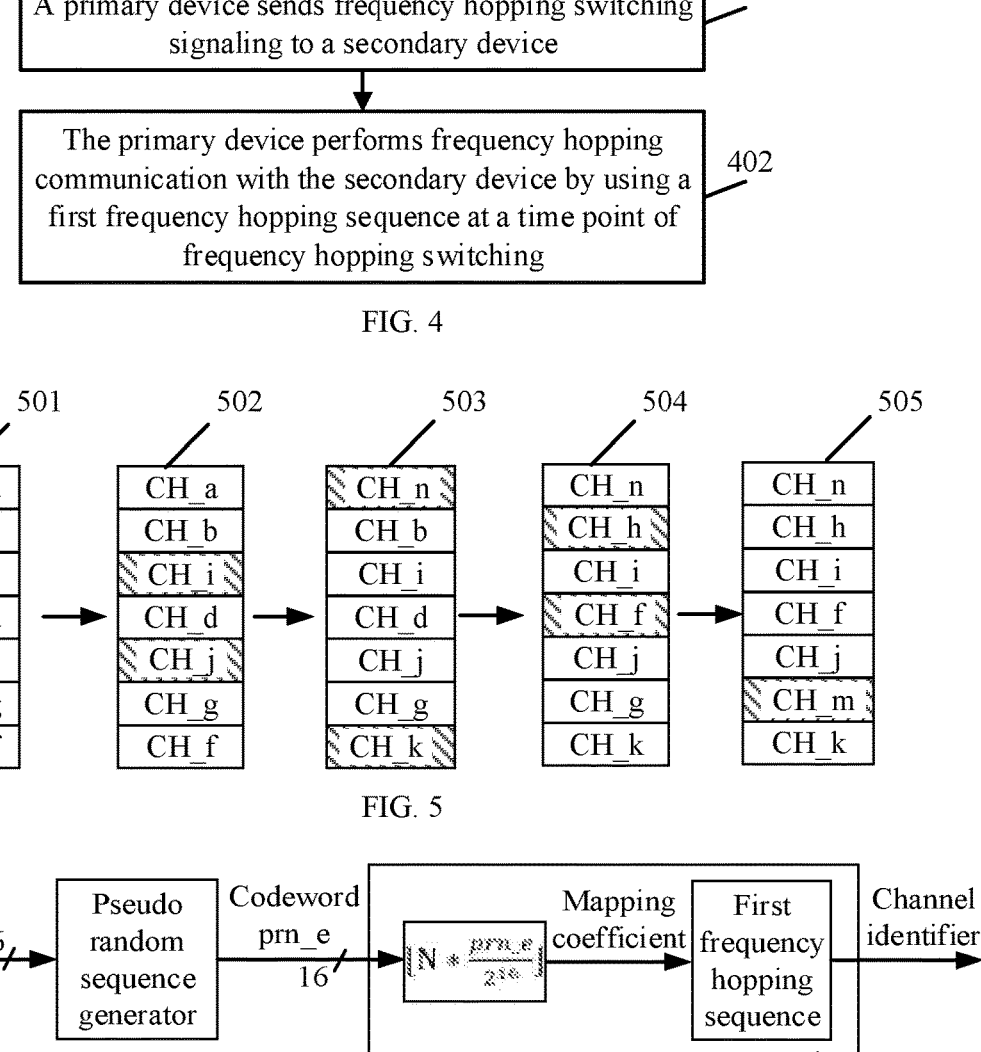
FIG. 4 is a schematic flowchart of a frequency hopping communication method for short-distance wireless communication according to an embodiment of this application.
FIG. 5 is a schematic diagram of frequency hopping sequence transformation according to an embodiment of this application.
FIG. 6 is a schematic flowchart of determining a frequency hopping communication channel in a frequency hopping communication method according to an embodiment of this application.

The following describes a frequency hopping communication method for short-distance wireless communication. An execution body of the frequency hopping communication method may be a primary device, or may be a chip in the primary device. In an embodiment of this application, description is performed by using the primary device as the execution body. FIG. 4 is a schematic flowchart of a frequency hopping communication method for short-distance wireless communication according to an embodiment of this application. The frequency hopping communication method includes the following steps.

Step 401: A primary device sends frequency hopping switching signaling to a secondary device. The frequency hopping switching signaling indicates a first frequency hopping sequence and a time point of frequency hopping switching. The first frequency hopping sequence is different from a second frequency hopping sequence that is currently for frequency hopping communication, the first frequency hopping sequence and the second frequency hopping sequence each include N channels, and M reserved channels in the first frequency hopping sequence are consistent with M reserved channels in the second frequency hopping sequence. Both M and N are positive integers, and M is less than N.

In an example, a frequency hopping sequence specifies a quantity of channels and a specific channel that are used by the primary device and the secondary device to perform frequency hopping communication. The quantity of channels is N. There are M reserved channels between the first frequency hopping sequence and the second frequency hopping sequence, and a location of the reserved channels and a channel identifier are the same in the first frequency hopping sequence and the second frequency hopping sequence.

Step 402: The primary device performs frequency hopping communication with the secondary device by using the first frequency hopping sequence at the time point of the frequency hopping switching.

In an example, after the primary device sends the frequency hopping switching signaling to the secondary device, and after the time point of the frequency hopping switching, the primary device switches to perform frequency hopping communication with the secondary device by using the first frequency hopping sequence.

In the frequency hopping communication method in an embodiment of this application, in a process of communication between the primary device and the secondary device, when a frequency hopping sequence needs to be switched, it is ensured that a frequency used for each frequency hopping remains unchanged (in other words, N remains unchanged), and there are M reserved channels between the first frequency hopping sequence and the second frequency hopping sequence, so that the primary device switches from the second frequency hopping sequence to the first frequency hopping sequence at the time point of the frequency hopping switching, and performs frequency hopping communication with the secondary device based on the first frequency hopping sequence. Even if the secondary device still performs frequency hopping communication with the primary device by using the second frequency hopping sequence (for example, when interference is severe, the secondary device cannot receive frequency hopping switching signaling), because there are M same channels between the first frequency hopping sequence and the second frequency hopping sequence (in other words, there is an intersection set between the first frequency hopping sequence and the second frequency hopping sequence), there is still an M/N probability that the primary device and the secondary device can effectively communicate with each other, so that a probability of successful communication between the primary device and the secondary device is fully and effectively ensured, and stability of a communication link between the primary device and the secondary device is improved.

It is noted that specific values of M and N may be set based on an actual situation. This is not limited. M may be $\frac{2}{3}$ N to ensure a high probability of successful communication between the primary device and the secondary device.

In some possible embodiments, the frequency hopping switching signaling includes a mapping relationship between N sequence number indexes and N channel identifiers, and the channel identifier indicates a channel in the first frequency hopping sequence.

In an embodiment of this application, a manner in which the frequency hopping switching signaling indicates the first frequency hopping sequence is that the signaling carries the mapping relationship between the N sequence number indexes and the N channel identifiers. The channel identifier indicates the channel in the first frequency hopping sequence. For example, it is assumed that the first frequency hopping sequence includes five channels. A signaling format of "0: CH_a; 1: CH_b; 2: CH_c; 3: CH_d; 4: CH_e; 5: CH_g; 6: CH_f" or "0-CH_a; 1-CH_b; 2-CH_c; 3-CH_d; 4-CH_e; 5-CH_g; 6-CH_f" may indicate the first frequency hopping sequence. In an example, another signaling format may indicate the first frequency hopping sequence. It should be noted that signaling formats of the first frequency hopping sequence and the second frequency hopping sequence may be the same or different, provided that the primary device and the secondary device agree on the signaling formats.

In addition, if the first frequency hopping sequence or the second frequency hopping sequence is described in an easily understood and intuitive manner, the first frequency hopping sequence or the second frequency hopping sequence may be described by using a channel mapping table. FIG. 5 is a schematic diagram of frequency hopping sequence transformation according to an embodiment of this application. A channel mapping table 501 may be understood as the second frequency hopping sequence, and a channel mapping table 502 may be understood as the first frequency hopping sequence. In FIG. 5, an example in which N is 7 is used. In this case, as shown in FIG. 5, M is 5, and the five reserved channels are separately CH_a; CH_b; CH_d; CH_g; and CH_f.

After the frequency hopping communication method in an embodiment of this application is used, when the primary device and the secondary device perform frequency hopping communication by using the first frequency hopping sequence or the second frequency hopping sequence, mapping of original two tables (for example, the table 301 and the table 302 in FIG. 3) is simplified into mapping of one table (namely, the first frequency hopping sequence or the second frequency hopping sequence), so that implementation complexity is reduced. An example in which frequency hopping communication is performed by using the first frequency hopping sequence is used for description below. Referring to FIG. 5 and FIG. 6, FIG. 6 is a schematic flowchart of determining a frequency hopping communication channel in a frequency hopping communication method according to an embodiment of this application. It is assumed that the channel mapping table 502 in FIG. 5 is used as the first frequency hopping sequence. As shown in FIG. 5, both the primary device and the secondary device use N=7 channels for communication. The primary device is used as an example. The primary device first uses a count of a slot counter of the primary device and a device ID of the primary device as inputs. The foregoing information is input into a pseudo random sequence generator to generate a codeword prn_e. A modulo N operation (in this case, N is 7) is performed on the codeword prn_e to obtain a corresponding mapping coefficient. Finally, a corresponding first frequency hopping sequence is queried based on the mapping coefficient, and a channel identifier of a final frequency hopping communication channel is output. It can be learned that, when the frequency hopping switching signaling cannot be successfully interacted, when the mapping coefficient=1, 2, 4, 6, or 7, the primary device and the secondary device can still successfully communicate with each other, in other words, a probability of successful communication between the primary device and the secondary device is $\frac{5}{7}$ (that is, 71%). It can be learned that, by using the frequency hopping communication method in an embodiment of this application, the probability of successful communication between the primary device and the secondary device can be effectively improved when interference is severe.

In some possible embodiments, the frequency hopping communication method further includes, for example, the primary device broadcasts the second frequency hopping sequence, to help the secondary device obtain the second frequency hopping sequence from a broadcast signal.

Figure 7A:
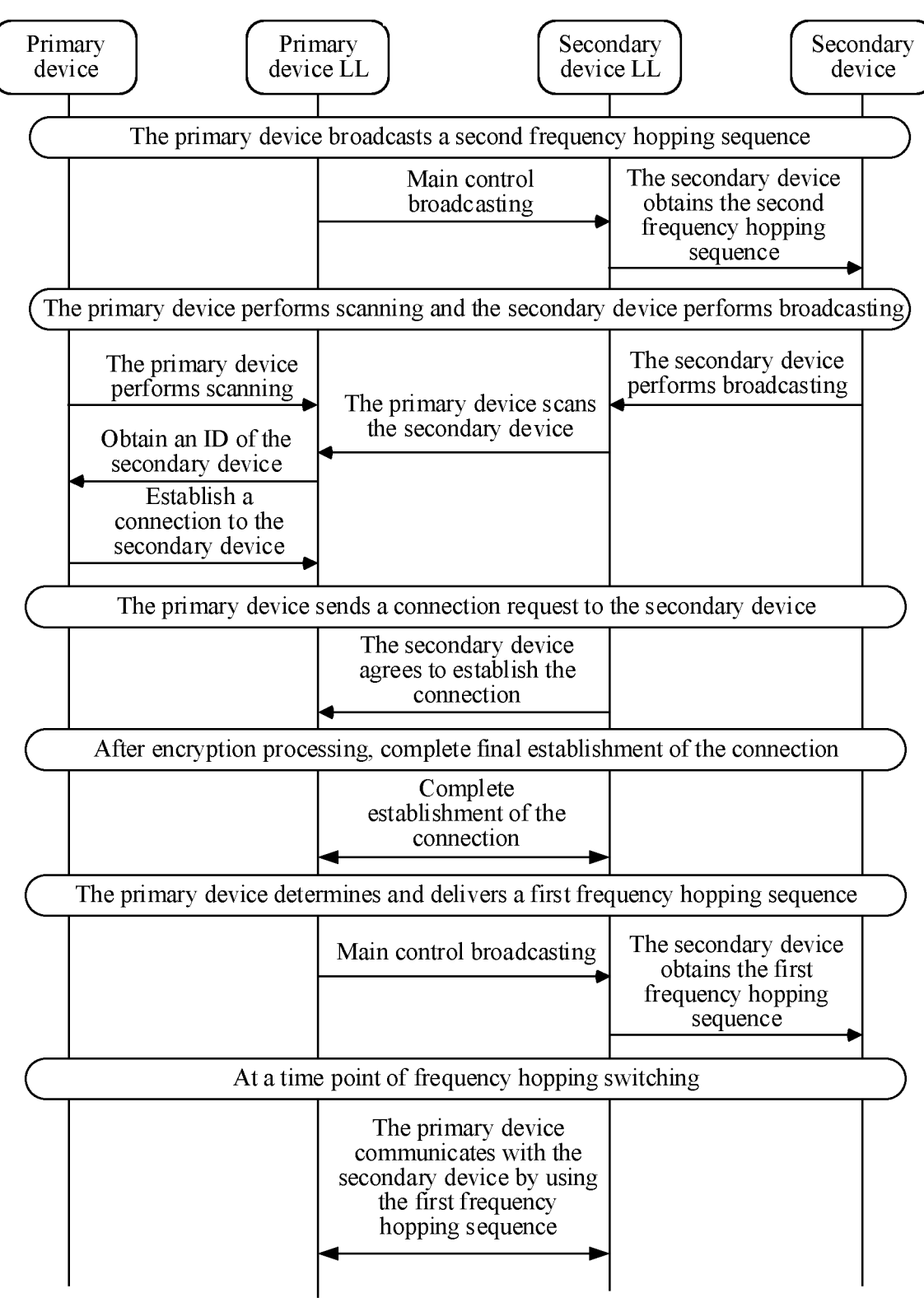
FIG. 7A, FIG. 7B, FIG. 7C, and FIG. 7D are schematic interaction flowcharts of a frequency hopping communication method according to embodiments of this application.

In embodiments of this application, FIG. 7A, FIG. 7B, FIG. 7C, and FIG. 7D are schematic interaction flowcharts of a frequency hopping communication method according to embodiments of this application. Referring to FIG. 7A, there are many methods for obtaining the second frequency hopping sequence by the secondary device. For example, the primary device broadcasts the second frequency hopping sequence, and the secondary device may obtain the second frequency hopping sequence from the broadcast signal by receiving the broadcast signal. A manner in which the primary device broadcasts the second frequency hopping sequence to enable the secondary device to obtain the second frequency hopping sequence is applicable to a scenario including one primary device and a plurality of secondary devices. In an example, before the primary device establishes a connection to the secondary devices, the primary device broadcasts the second frequency hopping sequence to the outside by using a link layer (LL) of the primary device (Primary device LL), to agree to perform frequency hopping communication by using the second frequency hopping sequence. It should be noted that, after broadcasting, the primary device does not need to receive feedback signaling of the secondary device. After the secondary device receives the broadcast signal of the primary device by using a link layer (LL) of the secondary device (Secondary device LL), the secondary device can obtain the second frequency hopping sequence. Then, in a manner in which the primary device scans a broadcast signal of the secondary device, the primary device may obtain a device ID of the secondary device, and the primary device may further send, based on the device ID of the secondary device and to the secondary device, a connection request for establishing a data path connection. After the secondary device agrees to establish the connection, the primary device and the secondary device may complete, after exchanging data encryption information of each other, final establishment of the data path connection. In this way, the primary device and the secondary device can perform frequency hopping communication by using the second frequency hopping sequence.

In some possible embodiments, the frequency hopping communication method further includes obtaining the device ID of the secondary device; sending, based on the device ID of the secondary device and to the secondary device, the connection request for requesting to establish the data path connection, where the connection request includes the second frequency hopping sequence; and receiving a connection acknowledgment instruction sent by the secondary device in response to the connection request.

Figure 7B:
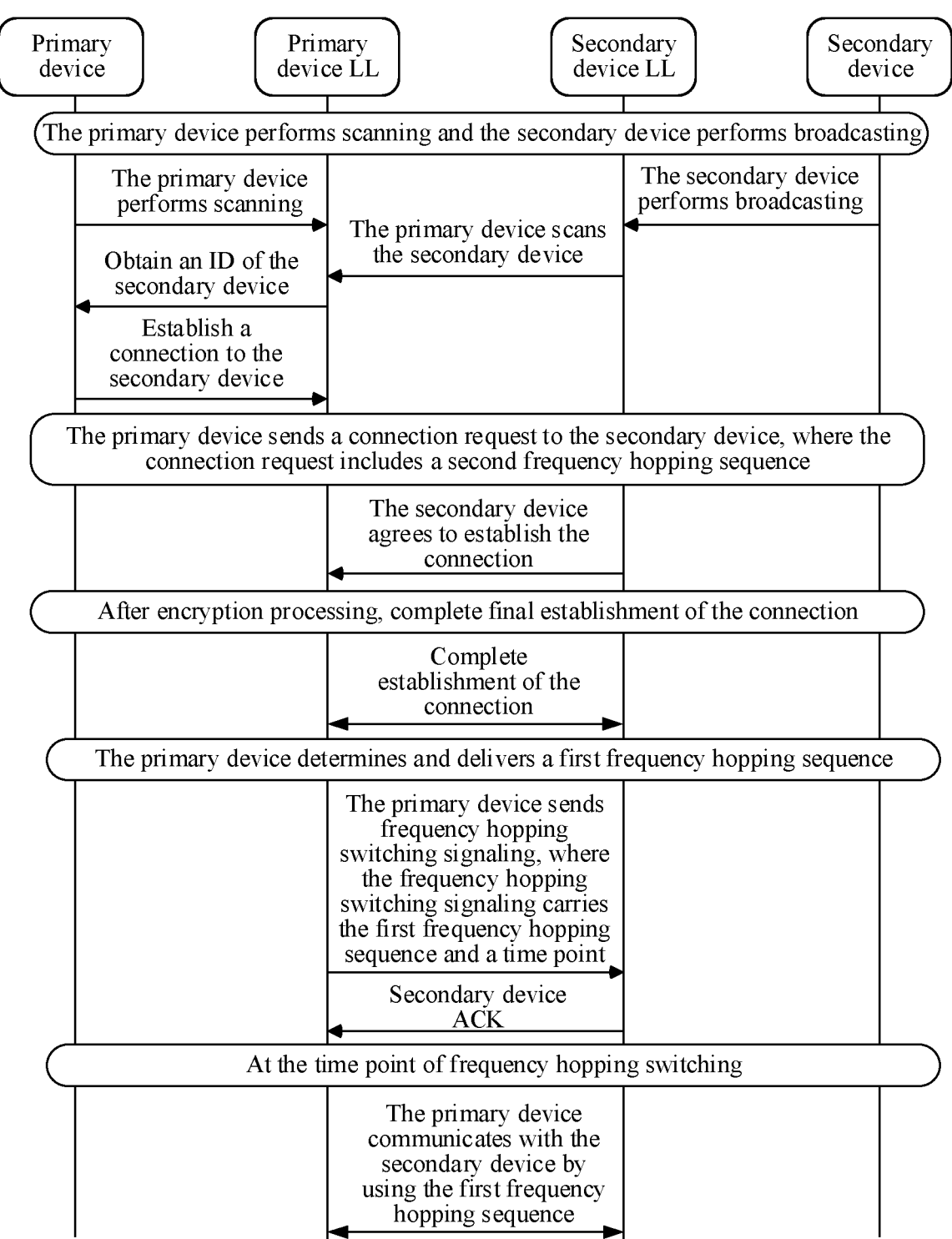

In an embodiment of this application, another method for obtaining the second frequency hopping sequence by the secondary device is, after obtaining the device ID of the secondary device, requesting, based on the device ID, the secondary device to establish the data path connection. The connection request may carry the second frequency hopping sequence, to enable the secondary device to obtain the second frequency hopping sequence based on the connection request. Referring to FIG. 7B, by scanning a broadcast signal of the secondary device, the primary device may obtain the device ID of the secondary device. Then, the primary device may send, to the secondary device based on the device ID of the secondary device, the connection request for establishing the data path connection, where the connection request carries the second frequency hopping sequence. When the secondary device agrees to establish the connection, the secondary device sends the connection acknowledgment instruction to the primary device, so that the primary device and the secondary device complete, after exchanging data encryption information of each other, the final establishment of the data path connection. In this way, the primary device and the secondary device can perform frequency hopping communication by using the second frequency hopping sequence.

In some possible embodiments, the frequency hopping communication method further includes, after establishing the data path connection to the secondary device, sending first negotiation signaling to the secondary device, where the first negotiation signaling includes the second frequency hopping sequence; and receiving a first negotiation acknowledgment instruction that is sent by the secondary device in response to the first negotiation signaling.

Figure 7C:
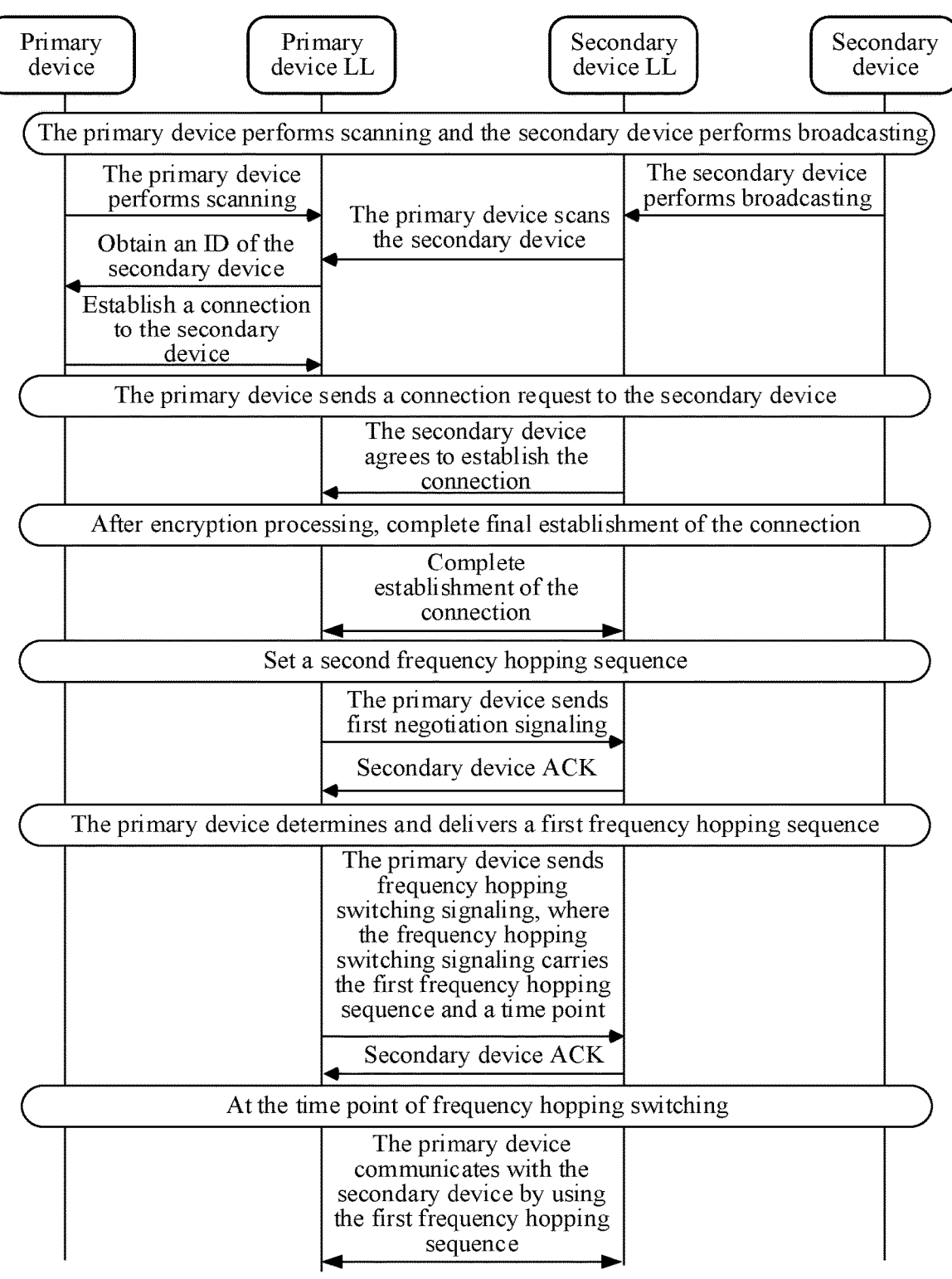

In an embodiment of this application, referring to FIG. 7C, the primary device may alternatively send, after establishing the data path connection to the secondary device, the first negotiation signaling to the secondary device. The first negotiation signaling may carry the second frequency hopping sequence, in other words, the primary device initiates a negotiation process of the second frequency hopping sequence. When accepting the second frequency hopping sequence, the secondary device may return the first negotiation acknowledgment instruction to the primary device, to complete negotiation of the second frequency hopping sequence. Further, the primary device and the secondary device can perform frequency hopping communication by using the second frequency hopping sequence. A manner of determining the second frequency hopping sequence through signaling negotiation is performed after the connection is established between the primary device and the secondary device, and the first negotiation acknowledgment instruction (for example, an ACK instruction sent by the secondary device in FIG. 7C) of the secondary device needs to be received. When the primary device does not receive the first negotiation acknowledgment instruction sent by the secondary device, the primary device resends the first negotiation signaling to the secondary device.

In some possible embodiments, the frequency hopping communication method further includes receiving second negotiation signaling sent by the secondary device, where the second negotiation signaling is sent after the secondary device establishes the data path connection to the primary device, and the second negotiation signaling includes the second frequency hopping sequence; and sending a second negotiation acknowledgment instruction to the secondary device in response to the second negotiation signaling.

Figure 7D:
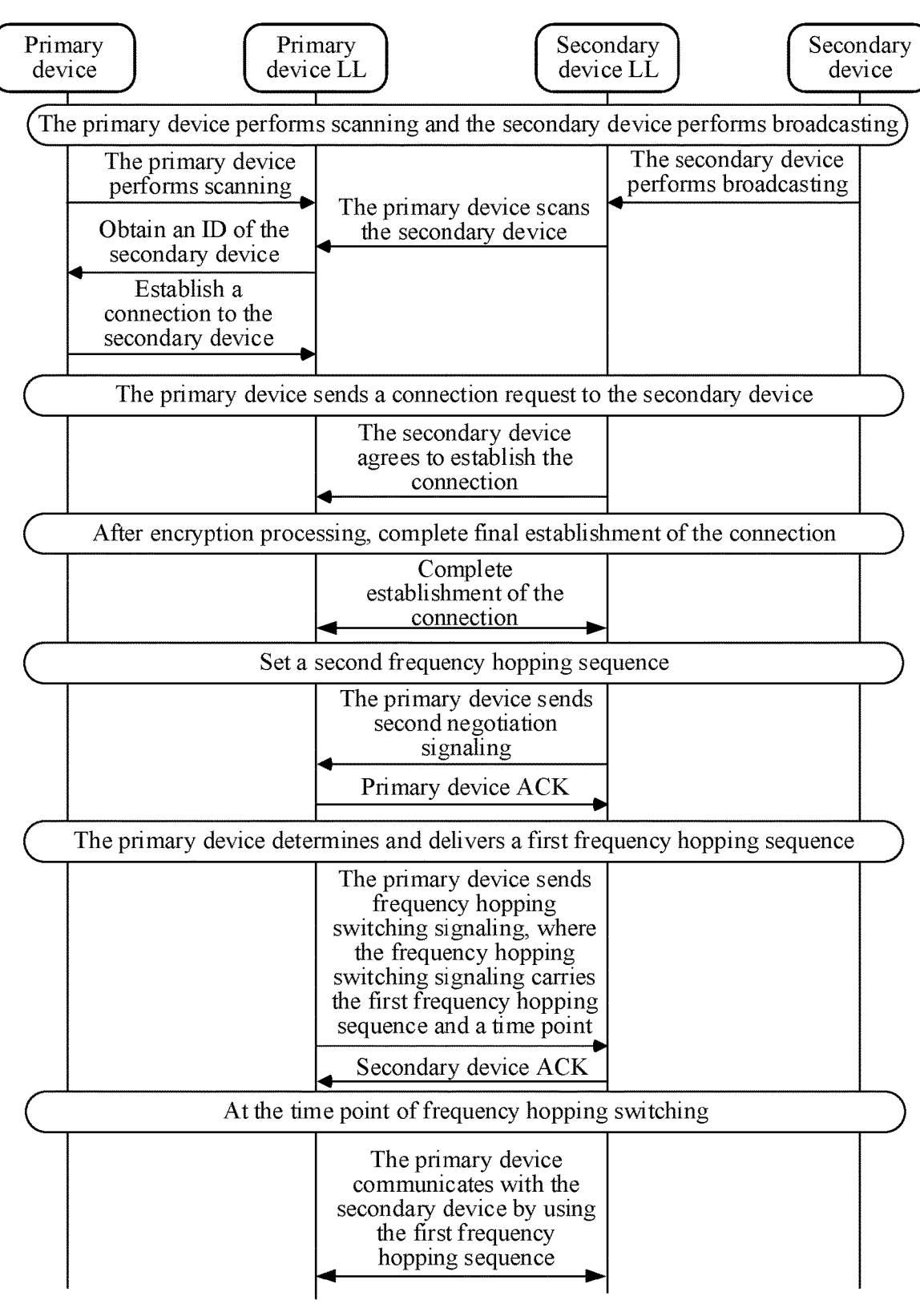

In an embodiment of this application, referring to FIG. 7D, alternatively, the secondary device may initiate the negotiation process of the second frequency hopping sequence. After the secondary device establishes the data path connection to the primary device, the secondary device sends, to the primary device, the second negotiation signaling that carries the second frequency hopping sequence. When accepting the second frequency hopping sequence, the primary device returns the second negotiation acknowledgment instruction (for example, an ACK instruction sent by the primary device in FIG. 7D) to the secondary device, to complete negotiation of the second frequency hopping sequence. In this way, the primary device and the secondary device may perform frequency hopping communication by using the second frequency hopping sequence.

In an example, in actual use, the primary device and the secondary device may first perform interactive communication by using all channels. BT is used as an example. All-channel interactive communication may be performed by using 37 data channels. When the primary device or the secondary device determines that all-channel communication quality is poor (for example, a quantity of unused channels in all channels reaches a threshold, or may meet another condition, which is not limited), the primary device or the secondary device initiates the negotiation of the second frequency hopping sequence, so that frequency hopping communication of a fixed quantity (for example, N) of channels is performed between the primary device and the secondary device.

Further, to help the primary device perform frequency hopping communication with the secondary device, the primary device and the secondary device further need to determine a quantity N of channels used in the frequency hopping communication, for example, N in FIG. 6. A reason is that N needs to be used when the frequency hopping communication channel is determined by using the process in FIG. 6. For a clear manner, referring to FIG. 7A to FIG. 7D, when the second frequency hopping sequence is determined in a manner of signaling negotiation or broadcasting, the quantity N of channels in the first frequency hopping sequence and the second frequency hopping sequence may be further determined. In other words, N is carried in the broadcast signal of the primary device, the connection request for establishing the data path connection, the first negotiation signaling, or the second negotiation signaling, so that the primary device and the secondary device determine the quantity N of channels used in the process of frequency hopping communication and an initial frequency hopping sequence, for example, the second frequency hopping sequence. In another clear manner, N may be directly obtained by using the second frequency hopping sequence. In an example, there may be another clear manner. This is not limited herein.

In some possible embodiments, step 401 includes, when the second frequency hopping sequence meets a preset frequency hopping switching condition, the primary device sends the frequency hopping switching signaling to the secondary device.

In an embodiment of this application, when a current second frequency hopping sequence meets the preset frequency hopping switching condition, the primary device sends the frequency hopping switching signaling to the secondary device, to trigger frequency hopping sequence switching. The preset frequency hopping switching condition may be set based on an actual situation. This is not limited.

In some possible embodiments, the preset frequency hopping switching condition includes at least one of the following such as a quality evaluation parameter of the second frequency hopping sequence meets a sequence evaluation condition, where the quality evaluation parameter represents overall communication quality of the N channels in the second frequency hopping sequence; a quantity of the channels whose channel quality is lower than a quality threshold and that are in the second frequency hopping sequence is greater than a quantity threshold; and a change of a channel in a used channel set is detected, where the used channel set is a set of scanned channels whose interference energy values are less than an interference energy threshold or a set of Y scanned channels whose interference energy values are smallest, and Y is a positive integer.

In an example, in embodiments of this application, three possible preset frequency hopping switching conditions are provided, to better match an actual communication scenario. When communication quality of the second frequency hopping sequence is poor or a communication environment changes, frequency hopping sequence switching is triggered. The quality evaluation parameter represents overall communication quality of the N channels in the second frequency hopping sequence. For example, the quality evaluation parameter may be a first ratio of a total quantity of channels whose channel quality is lower than a quality threshold and that are in the N channels to the N channels, or may be a second ratio of a total quantity of channels that are in the N channels and that are not in the used channel set to the N channels. The quality evaluation parameter may alternatively be another parameter. This is not limited. A sequence evaluation condition may be set based on an actual situation. This is not limited. For example, the sequence evaluation condition is that the first ratio is greater than a first ratio threshold, or the second ratio is greater than a second ratio threshold. Values of the first ratio threshold and the second ratio threshold may be set based on an actual situation. This is not limited. When determining that the quality evaluation parameter of the second frequency hopping sequence meets the sequence evaluation condition, the primary device may determine that the second frequency hopping sequence meets the preset frequency hopping switching condition; otherwise, the primary device determines that the second frequency hopping sequence does not meet the preset frequency hopping switching condition.

Further, a parameter that can represent communication quality of a channel may be used as the channel quality. This is not limited. The channel quality includes, for example, a bit error rate (BER) or a packet error rate (PER). The BER refers to a proportion (an average value) of a quantity of bits with errors in a total quantity of transmitted bits. The PER refers to packet errors caused by a same packet received for two times, packet loss, or reverse packet sequence. The quality threshold may be set based on an actual situation. This is not limited. The channel quality of each channel is determined, and the first ratio is determined based on a channel instruction and a channel threshold.

The used channel set is the set of scanned channels whose interference energy values are less than the interference energy threshold or the set of Y scanned channels whose interference energy values are smallest, and Y is a positive integer. A value of Y may be set based on an actual situation. For example, Y may be set to N. The interference energy values of the scanned channels are obtained, the interference energy values are sorted in ascending order, and first Y scanned channels are selected as the used channel set. An interference energy value represents an interference magnitude of a channel. A received signal strength indication/indicator (RSSI) or the like may be used as the interference energy value. This is not limited. The interference energy threshold may be set based on an actual situation. This is not limited. The second ratio is determined based on the used channel set. An interference energy value of each channel may be determined by periodically scanning a signal of the channel. In particular, when an interference energy value of a channel is obtained, the channel does not need to be in a data path connection state.

In addition, the quantity threshold may be set based on an actual situation. This is not limited. The primary device first determines, based on the channel quality of the channel and the quality threshold, the quantity of channels whose channel quality is lower than the quality threshold and that are in the second frequency hopping sequence, and then determines, based on the quantity threshold, whether the second frequency hopping sequence meets the preset frequency hopping switching condition. When the quantity of channels is greater than the quantity threshold, the primary device determines that the second frequency hopping sequence meets the preset frequency hopping switching condition; otherwise, the primary device determines that the second frequency hopping sequence does not meet the preset frequency hopping switching condition.

Finally, the primary device may further periodically detect whether a channel in the used channel set changes. When a used channel set determined in a previous periodicity is different from a used channel set determined in a current periodicity, the primary device determines that the current second frequency hopping sequence meets the preset frequency hopping switching condition; otherwise, the primary device determines that the second frequency hopping sequence does not meet the preset frequency hopping switching condition.

It is noted that, in addition to determining, by the primary device, whether the second frequency hopping sequence meets the preset frequency hopping switching condition, the secondary device may alternatively determine whether the second frequency hopping sequence meets the preset frequency hopping switching condition, and transmit a determining result to the primary device. The primary device may compare the received determining result with a determining result of the primary device, to verify whether the determining result of the primary device is accurate.

In some possible embodiments, the frequency hopping communication method further includes replacing N–M channels that meet a preset unused channel condition in the N channels in the second frequency hopping sequence with new used channels, to obtain the first frequency hopping sequence.

In an embodiment of this application, when the second frequency hopping sequence meets the preset frequency hopping switching condition, and the first frequency hopping sequence is obtained based on the second frequency hopping sequence, the N–M channels that meet the unused channel condition in the second frequency hopping sequence are replaced with the new used channels, so that the primary device and the secondary device can perform frequency hopping communication by using the second frequency hopping sequence with better channel quality, to ensure communication quality between the primary device and the secondary device. The preset unused channel condition may be set based on an actual situation. This is not limited. Further, after a value of M is set, a value of N–M can be uniquely determined. It is assumed that Q=N–M. When a total quantity X of channels that meet the preset unused channel condition is less than Q, Q=X, and M=N–Q. In other words, when X is less than Q, only X channels in the N channels are replaced with new used channels. In this case, there are N–X reserved channels. When X is greater than or equal to Q, Q channels in the N channels are replaced with new used channels. In this case, there are N–Q reserved channels.

In an example, when all the N channels in the second frequency hopping sequence meet the preset unused channel condition, the frequency hopping sequence may be replaced for a plurality of times, to complete replacement of the N channels, so as to effectively ensure a communication probability between the primary device and the secondary device. Referring to FIG. 5, the channel mapping table 501 may be the second frequency hopping sequence. In this case, all the seven channels in the channel mapping table 501 are unused channels, in other words, all the seven channels meet the preset unused channel condition. In this case, the channel mapping table 501 may be completely replaced by switching channels for four times. In an example, for the first time, the channel mapping table 501 is switched to the channel mapping table 502, and CH_c and CH_e are switched to CH_i and CH_j. The channel mapping table 502 is not re-sorted, and only an updated frequency is replaced. For the second time, the channel mapping table 502 is switched to a channel mapping table 503, and CH_a and CH_f are replaced with CH_n and CH_k. For the third time, the channel mapping table 503 is switched to a channel mapping table 504, and CH_b and CH_d are replaced with CH_h and CH_f. For the fourth time, the channel mapping table 504 is switched to a channel mapping table 505, and CH_g is replaced with CH_m.

In some possible embodiments, the replacing N–M channels that meet a preset unused channel condition in the N channels in the second frequency hopping sequence with new used channels, to obtain a first frequency hopping sequence includes separately obtaining channel quality of N channels in the second frequency hopping sequence; and replacing the N–M channels whose channel quality is lower than the quality threshold in the N channels in the second frequency hopping sequence with the new used channels, to obtain the first frequency hopping sequence.

In an embodiment of this application, the preset unused channel condition is that channel quality of a channel is lower than the quality threshold, and the channel in the second frequency hopping sequence is replaced based on the channel quality, to obtain the first frequency hopping sequence with better channel quality. The channel quality may be implemented by using a BER, a PER, or the like, and a value of the quality threshold may be set based on an actual situation. The quality threshold herein may be the same as or different from the quality threshold in determining a preset frequency hopping switching condition. This is not limited.

In some possible embodiments, the replacing N–M channels that meet a preset unused channel condition in the N channels in the second frequency hopping sequence with new used channels, to obtain a first frequency hopping sequence includes determining the used channel set, where the used channel set is the set of scanned channels whose interference energy values are less than the interference energy threshold or the set of Y scanned channels whose interference energy values are smallest, and Y is a positive integer; and replacing the N–M channels that are in the N channels in the second frequency hopping sequence and that are not in the used channel set with the new used channels, to obtain the first frequency hopping sequence.

In an embodiment of this application, the preset unused channel condition is that a channel is not in the used channel set. The channel that is in the second frequency hopping sequence and that is not in the used channel set is replaced with a new used channel, to obtain the first frequency hopping sequence with better channel quality. The received signal strength indication or the like may be used as an interference energy value, and the interference energy threshold and a value of Y may be set based on an actual situation. For example, Y may be set to N. The interference energy threshold herein may be the same as or different from the interference energy threshold in the determining a preset frequency hopping switching condition, and Y herein may be the same as or different from Y in the determining a preset frequency hopping switching condition. This is not limited.

In some possible embodiments, the determining a used channel set includes performing channel scanning based on a preset time interval, and determining an interference energy value corresponding to the scanned channel; and determining the scanned channels whose interference energy values are less than the interference energy threshold as the used channel set; or determining first Y scanned channels whose interference energy values are smallest as the used channel.

In an embodiment of this application, the interference energy value of each scanned channel may be determined through channel scanning, where the interference energy value represents an interference degree of a channel; and the scanned channels whose interference energy values are less than the interference energy threshold may be used as the used channel set; or the first Y scanned channels whose interference energy values are smallest may be determined as the used channel set. There is another method for determining the used channel set. This is not limited. A value of the preset time interval may be set based on an actual situation. This is not limited.

In some possible embodiments, refer to FIG. 7A to FIG. 7D. After determining the first frequency hopping sequence, the primary device sends the first frequency hopping sequence to the secondary device in a manner of main control broadcasting or on a data path. Refer to FIG. 7A. The primary device broadcasts the frequency hopping switching signaling, so that the secondary device obtains the first frequency hopping sequence and the time point of the frequency hopping switching from the broadcast signal of the primary device. The primary device and the secondary device switch, at the time point of the frequency hopping switching, to perform frequency hopping communication by using the first frequency hopping sequence. However, when the secondary device cannot receive the broadcast signal of the primary device, the primary device switches, at the time point of the frequency hopping switching, to perform frequency hopping communication with the secondary device by using the first frequency hopping sequence, while the secondary device still performs frequency hopping communication with the primary device by using the second frequency hopping sequence. In this case, there is still an M/N probability of successful communication. Refer to FIG. 7C and FIG. 7D. The primary device sends the frequency hopping switching signaling on the data path, so that the secondary device receives the frequency hopping switching signaling and returns a switching acknowledgment instruction (for example, an ACK instruction sent by the secondary device in FIG. 7B). The primary device and the secondary device switch, at the time point of the frequency hopping switching, to perform frequency hopping communication by using the first frequency hopping sequence. However, when the secondary device does not receive the frequency hopping switching signaling, in other words, the primary device does not receive the switching acknowledgment instruction returned by the secondary device, the primary device switches, at the time point of the frequency hopping switching, to perform frequency hopping communication with the secondary device by using the first frequency hopping sequence, while the secondary device still performs frequency hopping communication with the primary device by using the second frequency hopping sequence. In this case, there is still an M/N probability of successful communication.

In some possible embodiments, the frequency hopping communication method further includes, when a switching acknowledgment instruction that is sent by the secondary device in response to the frequency hopping switching instruction is not received, resending the frequency hopping switching instruction to the secondary device until the time point of the frequency hopping switching.

In an embodiment of this application, when the switching acknowledgment instruction that is sent by the secondary device in response to the frequency hopping switching instruction is not received, the primary device resends the frequency hopping switching instruction to the secondary device until the time point of the frequency hopping switching. The frequency hopping switching instruction is resent, to ensure that the secondary device can switch to perform frequency hopping communication with the primary device by using the first frequency hopping sequence at the specified time point of the frequency hopping switching.

Embodiment 2

Figure 8:
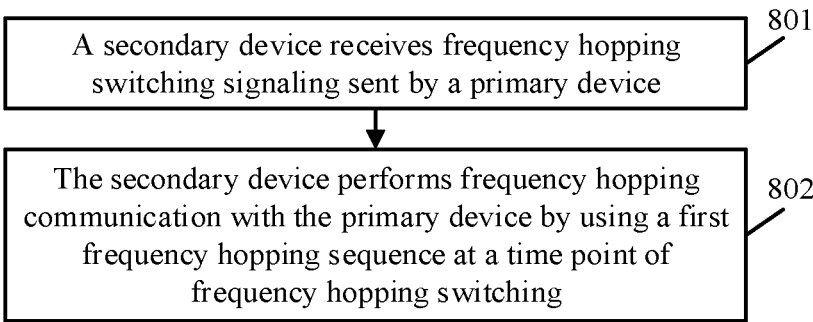
FIG. 8 is a schematic flowchart of a frequency hopping communication method for short-distance wireless communication according to an embodiment of this application.

Based on Embodiment 1 of the foregoing frequency hopping communication method for short-distance wireless communication, an embodiment of this application further provides a frequency hopping communication method for short-distance wireless communication. An execution body of the frequency hopping communication method may be a secondary device, or may be a chip in the secondary device. In an embodiment of this application, description is performed by using the secondary device as the execution body. FIG. 8 is a schematic flowchart of a frequency hopping communication method for short-distance wireless communication according to an embodiment of this application. The frequency hopping communication method includes the following steps.

Step 801: A secondary device receives frequency hopping switching signaling sent by a primary device, where the frequency hopping switching signaling indicates a first frequency hopping sequence and a time point of frequency hopping switching, the first frequency hopping sequence is different from a second frequency hopping sequence that is currently for frequency hopping communication, the first frequency hopping sequence and the second frequency hopping sequence each include N channels, M reserved channels in the first frequency hopping sequence are consistent with M reserved channels in the second frequency hopping sequence, both M and N are positive integers, and M is less than N.

Step 802: The secondary device performs frequency hopping communication with the primary device by using the first frequency hopping sequence at the time point of the frequency hopping switching.

In the frequency hopping communication method in an embodiment of this application, in a process of communication between the primary device and the secondary device, when a frequency hopping sequence needs to be switched, it is ensured that there are M reserved channels between the first frequency hopping sequence and the second frequency hopping sequence (where a location of the reserved channel and a channel identifier are the same in the first frequency hopping sequence and the second frequency hopping sequence), so that the primary device switches from the second frequency hopping sequence to the first frequency hopping sequence at the time point of the frequency hopping switching, and performs frequency hopping communication with the secondary device based on the first frequency hopping sequence. Even if the secondary device still performs frequency hopping communication with the primary device by using the second frequency hopping sequence, because there are M same channels between the first frequency hopping sequence and the second frequency hopping sequence, there is still an M/N probability that the primary device and the secondary device can effectively communicate with each other, so that a probability of successful communication between the primary device and the secondary device is effectively ensured, and stability of a communication link between the primary device and the secondary device is ensured.

In some possible embodiments, the frequency hopping switching signaling includes a mapping relationship between N sequence number indexes and N channel identifiers, and the channel identifier indicates a channel in the first frequency hopping sequence.

In some possible embodiments, the frequency hopping communication method further includes sending a switching acknowledgment instruction to the primary device in response to the frequency hopping switching instruction.

In some possible embodiments, the frequency hopping communication method further includes receiving a broadcast signal of the primary device, where the broadcast signal includes the second frequency hopping sequence.

In some possible embodiments, the frequency hopping communication method further includes receiving a connection request that is sent by the primary device and that is for requesting to establish a data path connection, where the connection request includes the second frequency hopping sequence; and sending a connection acknowledgment instruction to the primary device in response to the connection request.

In some possible embodiments, the frequency hopping communication method further includes receiving first negotiation signaling sent by the primary device, where the first negotiation signaling includes the second frequency hopping sequence; and sending a first negotiation acknowledgment instruction to the primary device in response to the first negotiation signaling.

In some possible embodiments, the frequency hopping communication method further includes, after establishing the data path connection to the primary device, sending second negotiation signaling to the primary device, where the second negotiation signaling includes the second frequency hopping sequence; and receiving a second negotiation acknowledgment instruction that is sent by the primary device in response to the second negotiation signaling.

For descriptions and beneficial effects of the frequency hopping communication method in an embodiment of this application, refer to the descriptions in Embodiment 1. Details are not described again.

Figure 9:
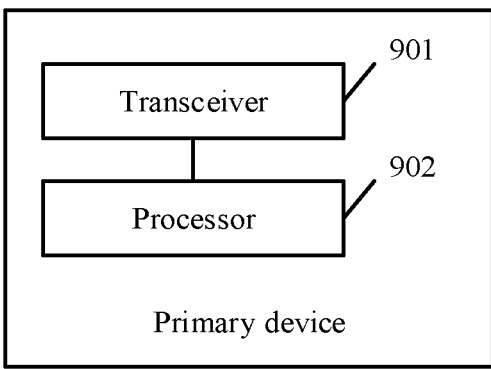
FIG. 9 is a schematic diagram of a structure of a primary device for short-distance wireless communication according to an embodiment of this application.

Based on Embodiment 1, an embodiment of this application further provides a primary device for short-distance wireless communication. FIG. 9 is a schematic diagram of a structure of a primary device for short-distance wireless communication according to an embodiment of this application. The primary device includes a transceiver 901, configured to send frequency hopping switching signaling to a secondary device, where the frequency hopping switching signaling indicates a first frequency hopping sequence and a time point of frequency hopping switching, the first frequency hopping sequence is different from a second frequency hopping sequence that is currently for frequency hopping communication, the first frequency hopping sequence and the second frequency hopping sequence each include N channels, M reserved channels in the first frequency hopping sequence are consistent with M reserved channels in the second frequency hopping sequence, both M and N are positive integers, and M is less than N; and a processor 902, configured to perform frequency hopping communication with the secondary device by using the first frequency hopping sequence and by using the transceiver 901 at the time point of the frequency hopping switching.

In some possible embodiments, the processor 902 is further configured to replace N–M channels that meet a preset unused channel condition in the N channels in the second frequency hopping sequence with new used channels, to obtain the first frequency hopping sequence.

For an implementation process and beneficial effects of the primary device in an embodiment of this application, refer to the descriptions in Embodiment 1. Details are not described again.

Figure 10:
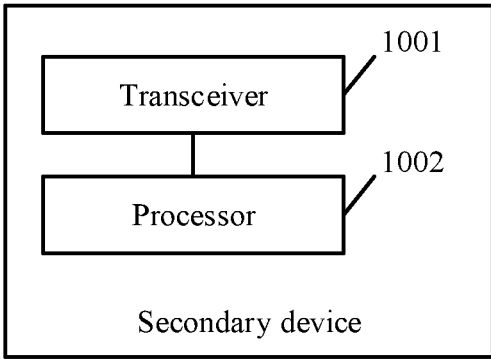
FIG. 10 is a schematic diagram of a structure of a secondary device for short-distance wireless communication according to an embodiment of this application.

Based on Embodiment 2, an embodiment of this application further provides a secondary device for short-distance wireless communication. FIG. 10 is a schematic diagram of a structure of a secondary device for short-distance wireless communication according to an embodiment of this application. The secondary device includes a transceiver 1001, configured to receive frequency hopping switching signaling sent by a primary device, where the frequency hopping switching signaling indicates a first frequency hopping sequence and a time point of frequency hopping switching, the first frequency hopping sequence is different from a second frequency hopping sequence that is currently for frequency hopping communication, the first frequency hopping sequence and the second frequency hopping sequence each include N channels, M reserved channels in the first frequency hopping sequence are consistent with M reserved channels in the second frequency hopping sequence, both M and N are positive integers, and M is less than N; and a processor 1002, configured to perform frequency hopping communication with the primary device by using the first frequency hopping sequence and by using the transceiver 1001 at the time point of the frequency hopping switching.

For an implementation process and beneficial effects of the secondary device in an embodiment of this application, refer to the descriptions in Embodiment 2. Details are not described again.

Based on Embodiment 1 and Embodiment 2, an embodiment of this application further provides a frequency hopping communication system for short-distance wireless communication, including the primary device and the secondary device.

Figure 11:
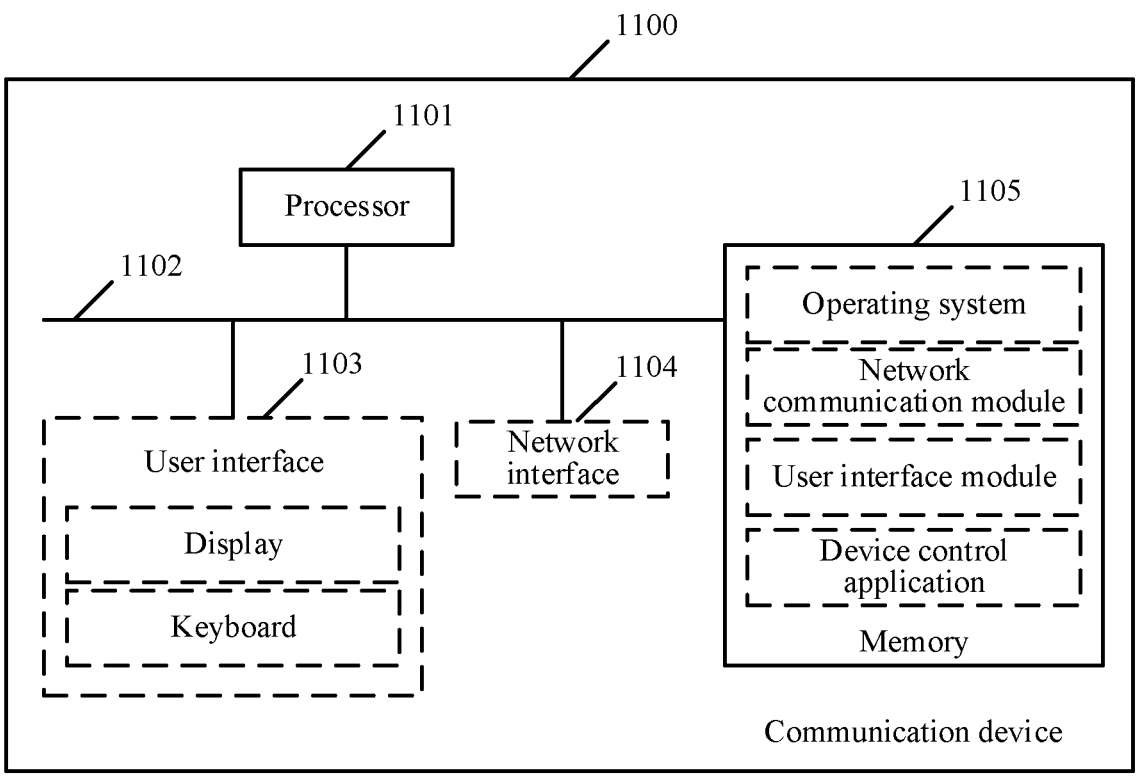
FIG. 11 is a schematic diagram of a structure of a communication device according to an embodiment of this application.

Based on Embodiment 1 and Embodiment 2, an embodiment of this application further provides a communication device. FIG. 11 is a schematic diagram of a structure of a communication device according to an embodiment of this application. As shown in FIG. 11, the communication device 1100 may include a processor 1101 and a memory 1105. In addition, the communication device 1100 may further include a user interface 1103, a network interface 1104, and at least one communication bus 1102. The communication bus 1102 is configured to implement connections and communication between these components. The user interface 1103 may include a display, a keyboard, and optionally, the user interface 1103 may further include a standard wired interface and wireless interface. The network interface 1104 may optionally include a standard wired interface and a wireless interface (such as a Wi-Fi interface). The memory 1105 may be a high-speed random-access memory (RAM) memory, or may be a non-volatile memory, such as at least one magnetic disk storage. Optionally, the memory 1105 may alternatively be at least one storage apparatus far away from the processor 1101. As shown in FIG. 11, as a computer-storage medium, the memory 1105 may include an operating system, a network communication module, a user interface module, and a device control application program.

In the communication device 1100 shown in FIG. 11, the network interface 1104 may provide a network communication function, the user interface 1103 is mainly configured to provide an input interface for a user, and the processor 1101 may be configured to invoke a device control application program stored in the memory 1105, to implement the steps of the frequency hopping communication method for short-distance wireless communication in any one of the foregoing method embodiments.

It should be understood that the communication device 1100 described in an embodiment of this application may perform the foregoing frequency hopping communication method for short-distance wireless communication. Details are not described herein again. In addition, beneficial effects of using a same method are not described in detail again.

In addition, it should be noted herein that an embodiment of this application further provides a computer storage medium, and the computer program includes program instructions. When executing the program instructions, a processor can perform the descriptions of the frequency hopping communication method for short-distance wireless communication in any one of the foregoing method embodiments. Therefore, details are not described herein again. In addition, beneficial effects of using a same method are not described in detail again. For technical details that are not disclosed in the embodiment of the computer storage medium in this application, refer to the descriptions of the method embodiments of this application.

Based on Embodiment 1 and Embodiment 2, an embodiment of this application further provides a computer program product including instructions. When the computer program product runs on a computer, the computer is enabled to perform the frequency hopping communication method for short-distance wireless communication in Embodiment 1 or Embodiment 2.

Based on Embodiment 1 and Embodiment 2, an embodiment of this application further provides a chip. The chip includes a processor and a data interface. The processor reads, by using the data interface, instructions stored in a memory, to perform the frequency hopping communication method for short-distance wireless communication in Embodiment 1 or Embodiment 2.

Optionally, in an implementation, the chip may further include the memory. The memory stores the instructions, and the processor is configured to execute the instructions stored in the memory. When the instructions are executed, the processor is configured to perform the frequency hopping communication method for short-distance wireless communication in Embodiment 1 or Embodiment 2.

A person of ordinary skill in the art may understand that all or some of the processes of the methods in embodiments may be implemented by a computer program instructing relevant hardware. The program may be stored in a computer-readable storage medium. When the program runs, the processes of the methods in embodiments are performed. The storage medium may be a magnetic disk, an optical disc, a read-only memory (ROM), a RAM, or the like.

Each apparatus and product described in the foregoing embodiments include modules/units, which may be software modules/units, or may be hardware modules/units, or may be partially software modules/units and partially hardware modules/units. For example, for each apparatus and product used in or integrated into a chip, each module/unit included in the apparatus and product may be implemented in a manner of hardware such as a circuit, or at least a part of modules/units may be implemented in a manner of a software program. The software program runs on a processor integrated in the chip, and a part of remaining (if any) modules/units may be implemented in a manner of hardware such as a circuit. For each apparatus and product used in or integrated into a chip module, each module/unit included in the apparatus and product may be implemented in a manner of hardware such as a circuit. Different modules/units may be located in a same component (for example, a chip or a circuit module) or different components of the chip module. Alternatively, at least a part of/units may be implemented in a manner a software program. The software program runs on a processor integrated in the chip module, and a part of remaining modules/units (if any) may be implemented in a manner of hardware such as a circuit. For each apparatus and product used in or integrated into a terminal, each module/unit included in the apparatus and product may be implemented in a manner of hardware such as a circuit. Different modules/units may be located in a same component (for example, a chip or a circuit module) or different components in the terminal. Alternatively, at least a part of modules/units may be implemented in a manner of a software program. The software program runs on a processor integrated in the terminal, and a part of remaining (if any) modules/units may be implemented in a manner of hardware such as a circuit.

The foregoing descriptions are example implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   sending frequency hopping switching signaling to a secondary device, wherein the frequency hopping switching signaling indicates a first frequency hopping sequence and a time point of frequency hopping switching, wherein the first frequency hopping sequence is different from a second frequency hopping sequence for frequency hopping communication, wherein the first frequency hopping sequence comprises N first channels, wherein the second frequency hopping sequence comprises N second channels, wherein M first reserved channels in the N first channels are consistent with M second reserved channels in the N second channels such that a location of the M first reserved channels and the M second reserved channels are the same, and an identifier of the M first reserved channels and the M second reserved channels are the same, wherein M and N are positive integers, and wherein M is less than N; and
   performing frequency hopping communication with the secondary device using the first frequency hopping sequence at the time point.

2. The method of claim 1, wherein the frequency hopping switching signaling comprises a mapping relationship between N sequence number indexes and N channel identifiers, and wherein each of the N channel identifiers indicates a channel in the first frequency hopping sequence.

3. The method of claim 1, further comprising further sending the frequency hopping switching signaling to the secondary device when the second frequency hopping sequence meets a preset frequency hopping switching condition.

4. The method of claim 3, wherein the preset frequency hopping switching condition comprises at least one of the following:
   a quality evaluation parameter of the second frequency hopping sequence meets a sequence evaluation condition, wherein the quality evaluation parameter represents overall communication quality of the N channels in the second frequency hopping sequence;
   a quantity of channels whose channel quality is lower than a quality threshold and that are in the second frequency hopping sequence is greater than a quantity threshold; and
   a change of a channel in a used channel set is detected occurs, wherein the used channel set is a set of scanned channels whose interference energy values are less than an interference energy threshold or a set of Y scanned channels whose interference energy values are smallest, and wherein Y is a positive integer.

5. The method of claim 1, further comprising resending the frequency hopping switching signaling to the secondary device until the time point of the frequency hopping switching when a switching acknowledgment instruction from the secondary device in response to the frequency hopping switching instruction is not received.

6. The method of claim 1, further comprising:

replacing N–M channels that meet a preset unused channel condition and that are in the N channels in the second frequency hopping sequence with new used channels; and obtaining the first frequency hopping sequence in response to the replacing.

7. The method of claim 6, wherein replacing the N–M channels comprises:

separately obtaining channel qualities of the N channels in the second frequency hopping sequence; and further replacing the N–M channels whose channel qualities are lower than a quality threshold and that are in the N channels in the second frequency hopping sequence with the new used channels.

8. The method of claim 6, wherein replacing the N–M channels comprises:

determining a used channel set, wherein the used channel set is a set of scanned channels whose interference energy values are less than an interference energy threshold or a set of Y scanned channels whose interference energy values are smallest, and wherein Y is a positive integer; and replacing the N–M channels that are in the N channels in the second frequency hopping sequence and that are not in the used channel set with the new used channels.

9. The method of claim 8, wherein determining the used channel set comprises:

performing channel scanning based on a preset time interval;

determining, based on the channel scanning, an interference energy value corresponding to a scanned channel; and determining, based on the interference energy value, scanned channels whose interference energy values are less than the interference energy threshold as the used channel set or first Y scanned channels whose interference energy values are smallest as the used channel set.

10. The method of claim 1, further comprising broadcasting the second frequency hopping sequence to enable the secondary device to obtain the second frequency hopping sequence from a broadcast signal.

11. The method of claim 1, further comprising:

obtaining a device identifier of the secondary device;

sending, to the secondary device based on the device identifier, a connection request requesting to establish a data path connection, wherein the connection request comprises the second frequency hopping sequence; and receiving, from the secondary device in response to the connection request, a connection acknowledgment instruction.

12. The method of claim 1, further comprising:

establishing a data path connection to the secondary device;

sending first negotiation signaling to the secondary device after establishing the data path connection to the secondary device, wherein the first negotiation signaling comprises the second frequency hopping sequence; and receiving, from the secondary device in response to the first negotiation signaling, a first negotiation acknowledgment instruction.

13. The method of claim 1, further comprising:

receiving first negotiation signaling from the secondary device, wherein the first negotiation signaling is based on a data path connection between the secondary device and a primary device, and wherein the first negotiation signaling comprises the second frequency hopping sequence; and sending a first negotiation acknowledgment instruction to the secondary device in response to the first negotiation signaling.

14. A method, comprising:

receiving frequency hopping switching signaling from a primary device, wherein the frequency hopping switching signaling indicates a first frequency hopping sequence and a time point of frequency hopping switching, wherein the first frequency hopping sequence is different from a second frequency hopping sequence for frequency hopping communication, wherein the first frequency hopping sequence comprises N first channels, wherein the second frequency hopping sequence comprises N second channels, wherein M first reserved channels in the N first channels are consistent with M second reserved channels in the N second channels such that a location of the M first reserved channels and the M second reserved channels are the same, and an identifier of the M first reserved channels and the M second reserved channels are the same, wherein M and N are positive integers, and wherein M is less than N; and performing frequency hopping communication with the primary device using the first frequency hopping sequence at the time point of the frequency hopping switching.

15. The method of claim 14, wherein the frequency hopping switching signaling comprises a mapping relationship between N sequence number indexes and N channel identifiers, and wherein each of the N channel identifiers indicates a channel in the first frequency hopping sequence.

16. The method of claim 14, further comprising further sending a switching acknowledgment instruction to the primary device in response to the frequency hopping switching signaling.

17. The method of claim 14, further comprising receiving a broadcast signal of the primary device, wherein the broadcast signal comprises the second frequency hopping sequence.

18. The method of claim 14, further comprising:

receiving, from the primary device, a connection request that is for requesting to establish a data path connection, wherein the connection request comprises the second frequency hopping sequence; and sending a connection acknowledgment instruction to the primary device in response to the connection request.

19. The method of claim 14, further comprising:

receiving first negotiation signaling from the primary device, wherein the first negotiation signaling comprises the second frequency hopping sequence; and sending a first negotiation acknowledgment instruction to the primary device in response to the first negotiation signaling.

20. A primary device, comprising:

a transceiver, configured to send frequency hopping switching signaling to a secondary device, wherein the frequency hopping switching signaling indicates a first frequency hopping sequence and a time point of frequency hopping switching, wherein the first frequency hopping sequence is different from a second frequency hopping sequence for frequency hopping communication, wherein the first frequency hopping sequence comprises N first channels, wherein the second frequency hopping sequence comprises N second channels, wherein M first reserved channels in the N first channels are consistent with M second reserved channels in the N second channels such that a location of the M first reserved channels and the M second reserved channels are the same, and an identifier of the M first reserved channels and the M second reserved channels are the same, wherein M and N are positive integers, and wherein M is less than N; and a processor coupled to the transceiver and configured to perform frequency hopping communication with the secondary device using the first frequency hopping sequence at the time point of the frequency hopping switching.

\*    \*    \*    \*    \*